United States Patent
Imai

(10) Patent No.: US 6,697,878 B1
(45) Date of Patent: Feb. 24, 2004

(54) COMPUTER HAVING A REMOTE PROCEDURE CALL MECHANISM OR AN OBJECT REQUEST BROKER MECHANISM, AND DATA TRANSFER METHOD FOR THE SAME

(75) Inventor: Yuji Imai, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,249

(22) Filed: Jan. 4, 1999

(30) Foreign Application Priority Data

Jul. 1, 1998 (JP) .......................................... 10-186082

(51) Int. Cl.[7] ................................................ G06F 9/46
(52) U.S. Cl. ........................ 709/316; 709/246; 709/232; 709/105; 709/201
(58) Field of Search ................................ 709/315, 316, 709/201, 230, 232, 237, 246, 245, 236, 231, 310, 105

(56) References Cited

U.S. PATENT DOCUMENTS

| | | | | |
|---|---|---|---|---|
| 4,878,166 A | * | 10/1989 | Johnson et al. ............... 710/307 |
| 5,142,672 A | * | 8/1992 | Johnson et al. ................. 710/27 |
| 5,276,684 A | * | 1/1994 | Pearson ........................ 370/438 |
| 5,550,987 A | * | 8/1996 | Tanaka ......................... 710/106 |
| 5,675,807 A | * | 10/1997 | Iswandhi et al. ............ 710/260 |
| 5,778,189 A | * | 7/1998 | Kimura et al. ............... 709/236 |
| 5,790,776 A | * | 8/1998 | Sonnier et al. ................ 714/10 |
| 5,926,636 A | * | 7/1999 | Lam et al. .................... 709/313 |
| 5,991,797 A | * | 11/1999 | Futral et al. ................. 709/216 |
| 6,044,415 A | * | 3/2000 | Futral et al. ................. 370/397 |
| 6,074,427 A | * | 6/2000 | Fought et al. ................. 703/21 |
| 6,163,834 A | * | 12/2000 | Garcia et al. ................ 711/206 |
| 6,181,704 B1 | * | 1/2001 | Drottar et al. ............... 370/410 |
| 6,185,601 B1 | * | 2/2001 | Wolff .......................... 709/105 |
| 6,223,270 B1 | * | 4/2001 | Chesson et al. ............. 711/202 |
| 6,333,929 B1 | * | 12/2001 | Drottar et al. ............... 370/362 |
| 6,418,479 B1 | * | 7/2002 | Houssein et al. ............ 709/245 |
| 6,421,742 B1 | * | 7/2002 | Tillier ......................... 709/201 |
| 6,493,343 B1 | * | 12/2002 | Garcia et al. ................ 370/394 |
| 6,529,972 B1 | * | 3/2003 | Coffman ....................... 710/56 |
| 6,545,981 B1 | * | 4/2003 | Garcia et al. ................ 370/242 |
| 6,594,701 B1 | * | 7/2003 | Forin .......................... 709/232 |
| 6,615,282 B1 | * | 9/2003 | Futral .......................... 710/1 |
| 2002/0059451 A1 | * | 5/2002 | Haviv ......................... 709/238 |
| 2002/0062402 A1 | * | 5/2002 | Regnier et al. ............. 709/313 |
| 2002/0073257 A1 | * | 6/2002 | Beukema et al. ............ 710/105 |
| 2003/0043794 A1 | * | 3/2003 | Cayton et al. ............... 370/386 |
| 2003/0145230 A1 | * | 7/2003 | Chiu et al. ................... 713/201 |

OTHER PUBLICATIONS

Wittle, M. "Direct Access File System (DAFS)." Network Appliance, Inc. Sep. 2001.*
Compaq. et al. "Virtual Interface Architecture Specification". Version 1.0. Dec. 16, 1997.*
Yiji et al. "CrispORB: High performance CORBA for System Area Network." IEEE. 1999.*
Horst, Robert W. "TNET: A Reliable System Area Network." IEEE. 1995.*
Dubnicki et al. "Design and Implementation of Virtual Memory–Mapped Communication on Myrinet." Apr. 1997.*

* cited by examiner

*Primary Examiner*—Sue Lao
*Assistant Examiner*—Lewis A. Bullock, Jr.
(74) *Attorney, Agent, or Firm*—Staas & Halsey LLP

(57) ABSTRACT

A computer having a remote procedure call (RPC) mechanism or an object request broker (ORB) mechanism in a distributed computing environment, is constructed comprising a physical memory, a data readout unit for reading out data stored in the physical memory, and a remote direct memory access (RDMA) unit for transferring the data read out by the data readout unit, directly to a physical memory included in a communicating opposite computer which is connected to the particular computer itself through a network, thereby to shorten a delay which is expended on the data transfer between the computers.

56 Claims, 39 Drawing Sheets

[TRANSMISSION PROGRAM SIDE]
INVOKE proxy FUNCTION    func( args )

[TRANSMISSION SIDE PROXY]
ACQUIRE CDR MANAGEMENT AREA
CREATE REQUEST HEADER (CONTAINING CONVERSION INTO CDR FORMAT)
CREATE REQUEST BODY (CONTAINING CONVERSION INTO CDR FORMAT)
FILL UP MESSAGE LENGTH OF HEADER
send() FROM socket

[TRANSMISSION SIDE TCP/IP STACK]
COPY MESSAGE IN KERNEL SPACE
DIVIDE MESSAGE INTO PACKETS
SEND OUT PACKETS

[TRANSMISSION SIDE PROXY]
FREE CDR AREA
STAND BY FOR REPLY

[RECEPTION SIDE TCP/IP STACK]
INTERRUPT UPON ARRIVAL OF MESSAGE
RESTRUCTURE PACKETS INTO MESSAGE
COPY MESSAGE IN USER SPACE

[RECEPTION SIDE skeleton]
INVERT HEADER WHILE IT IS BEING RECEIVED
SPECIFY OBJECT TO-BE-INVOKED
INVERT CDR FORMAT INTO "args" (ARRANGEMENT) WHILE IT IS BEING RECEIVED
SEARCH FOR FUNCTION TO-BE-INVOKED "func" ON BASIS OF METHOD NAME IN HEADER
INVOKE THREAD FOR EXECUTING "func", AND DELIVER "args" THERETO

FIG. 2    PRIOR ART

* STRUCTURE OF CDR MANAGEMENT AREA

```
struck CDR {            /*MANAGEMENT AREA*/
    char* buf;          /*ACTUAL BUFFER*/
    int   size;         /*SIZE OF buf*/
    char* tail;         /*REARMOST PART OF BUFFER CURRENTLY USED*/
}
```

* PSEUDO-CODE OF CDR

```
CDR_data ( data* data, CDR* cdr) {
    if (REMAINING AREA IS INSUFFICIENT FOR cdr OF data)
        REACQUIRE buf OF SOMEWHAT LARGER SIZE SO AS TO COPY CONTENTS;
    PACK data IN cdr
}
```

F I G. 4    PRIOR ART

```
offset    type                    VARIABLE NAME
0   ~ 3   : char             :    magic [4]              /* FIX CHARACTER STRING OF "GIOP" */
4         : octet            :    major_version;         /* ENTER "1" FIXEDLY */
5         : octet            :    minor_version;         /* ENTER "1" FIXEDLY */
6         : octet            :    flag                   /* 1:big-endian,   2:little-endian */
7         : octet            :    message_type           /* 1:INDICATE request MESSAGE */
8  ~ 11   : unsigned long    :    message_size
12 ~ 15   : unsigned long    :    request_id;
16        : boolean          :    response_expected;
17        : octet            :    reserved [3]           /* padding */
20 ~ 23   : int              :    sequence_type;         /* ENTER VALUE (10) INDICATING THAT */
                                                         /* object_key IN SUCCEEDING FIELD IS octet STRING */
24 ~ 27   : unsigned long    :    length;                /* length of object_ref */
28 ~ n    : octet            :    object_key [] ;        /* object to invoke */
n+1 ~ n+4 : unsigned long    :    string_length          /* operation name length */
n+5 ~ m   : char             :    operation_name []      /* method name to invoke */
```

F I G. 5    PRIOR ART

```
struct object_key {
    char    _IOR [4] ;              /*FIX CHARACTER STRING OF "IOR"*/
    int     hostname_length;        /*LENGTH OF hostname []*/
    char    hostname [] ;           /*NAME OF HOST WHERE OBJECT EXISTS*/
    int     port;                   /*TCP port NO. ACCEPTING SERVICE*/
}
```

FIG. 6  PRIOR ART

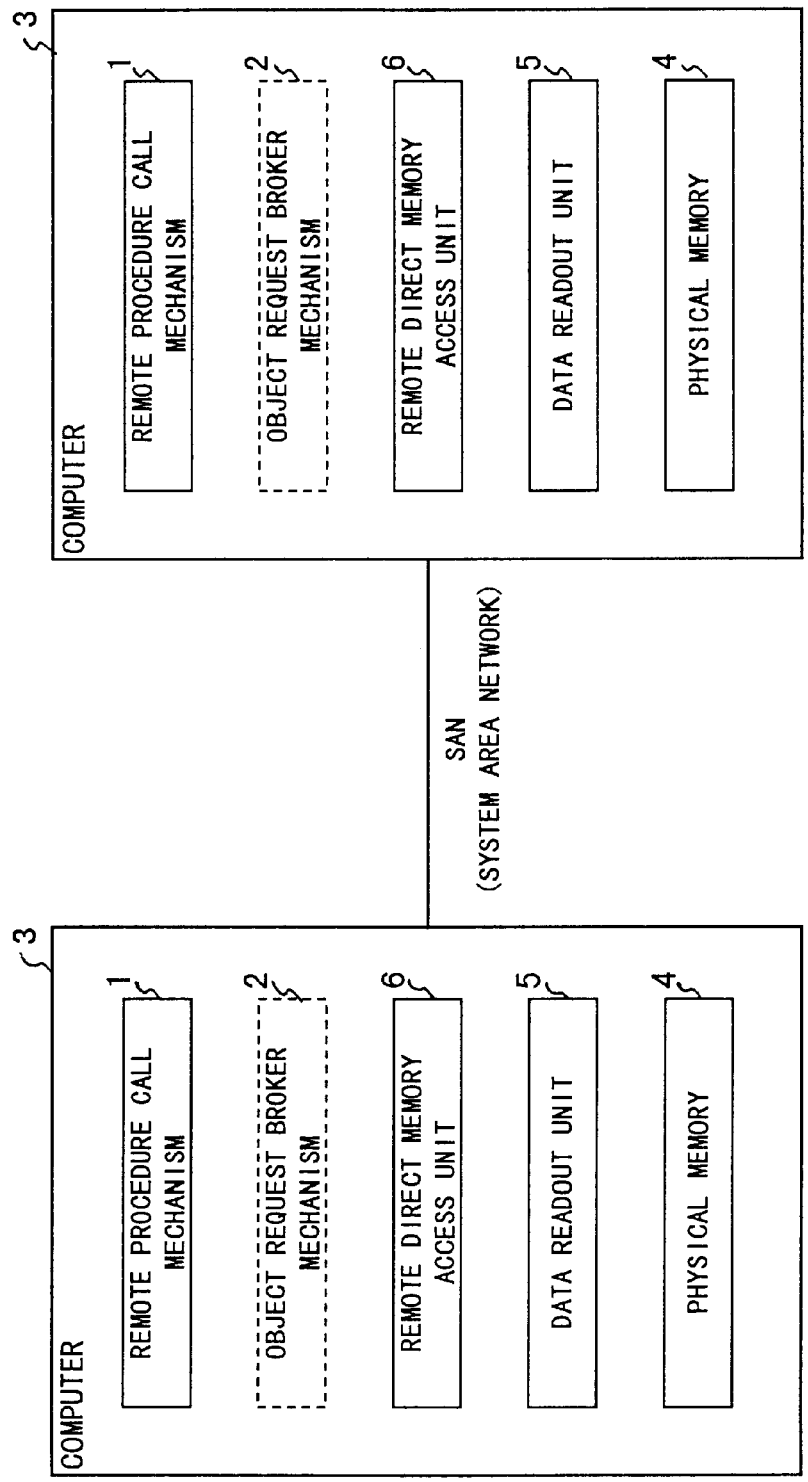
F I G. 7

[TRANSMISSION PROGRAM SIDE]
INVOKE proxy FUNCTION    func( args )

[TRANSMISSION SIDE PROXY]
  ACQUIRE CDR MANAGEMENT AREA
  CREATE REQUEST HEADER (CONTAINING CONVERSION INTO CDR FORMAT)
  CREATE REQUEST BODY (CONTAINING CONVERSION INTO CDR FORMAT)
  FILL UP MESSAGE LENGTH OF HEADER
  WIRE CDR "buf" (BUFFER) DOWN ON PHYSICAL MEMORY AS RDMA AREA
  TRANSIT CONTENTS OF "buf" BY RDMA

FREE CDR AREA
  STAND BY FOR REPLY

[RECEPTION SIDE RDMA DRIVER]
          INTERRUPT UPON ARRIVAL OF MESSAGE

[RECEPTION SIDE skeleton]
                  INVERT HEADER FROM DATA SUBJECTED TO RDMA

SPECIFY OBJECT TO-BE-INVOKED

INVERT DATA SUBJECTED TO RDMA, FROM CDR FORMAT INTO "args" (ARGUMENTS)

SEARCH FOR FUNCTION TO-BE-INVOKED "func" ON BASIS OF METHOD NAME IN HEADER

INVOKE THREAD FOR EXECUTING "func", AND DELIVER "args" THERETO

F I G. 9

```
struct target_data (
   longlong  first;     /* 0x12345678 */
   char      second;    /* 0x9A       */
   short     third;     /* 0xBCDE     */
)
```
EXAMPLE OF OBJECT FOR COMMUNICATIONS BASED ON CORBA
FIG. 11A
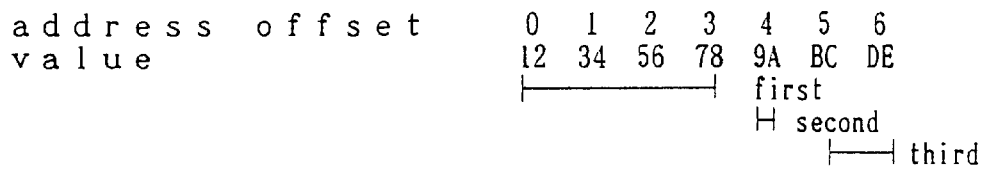
CASE WHERE NO LIMITATION IS PLACED ON short BYTE ALIGNMENT WITH BIG ENDIAN
FIG. 11B
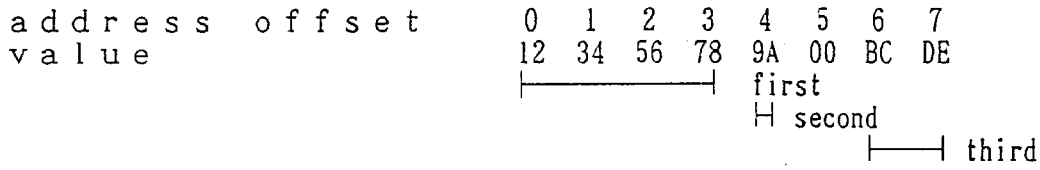
CASE WHERE short BYTE ALIGNMENT WITH BIG ENDIAN IS ON 2-BYTE BOUNDARIES
FIG. 11C
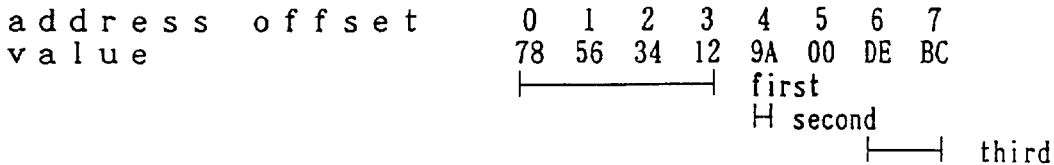
CASE WHERE short BYTE ALIGNMENT WITH LITTLE ENDIAN IS ON 2-BYTE BOUNDARIES
FIG. 11D

| node address | endian | alignment_type |
|---|---|---|
| node 0 | big | no-alignment |
| node 1 | big | 2byte-alignment |
| node 2 | big | 2byte-alignment |
| node 3 | little | 2byte-alignment |

FIG. 12

[TRANSMISSION SIDE proxy]
GENERATE proxy object (DELIVER DESTINATION OBJECT KEY)

[TRANSMISSION SIDE proxy]
EXTRACT DESTINATION HOST NAME AND PORT NAME FROM DESTINATION OBJECT KEY
if (THERE IS NO CONNECTION TO SAME HOST AND PORT) {
    MAKE REQUEST FOR ESTABLISHING CONNECTION
}

[TRANSMISSION SIDE TCP/IP STACK]
TRANSMIT CONNECTION ESTABLISHING REQUEST

[RECEPTION SIDE TCP/IP STACK]
RECEIVE CONNECTION ESTABLISHING REQUEST

[RECEPTION SIDE skeleton]
accept ()

[RECEPTION SIDE TCP/IP STACK]
REPLY ACCEPTANCE OF CONNECTION

[TRANSMISSION SIDE TCP/IP STACK]
RECEIVE CONNECTION ACCEPTING REPLY

[TRANSMISSION SIDE proxy]
COMPLETE CONNECTION ESTABLISHMENT

F I G. 1 3

[TRANSMISSION SIDE proxy]
TRANSMIT endian INFORMATION AND alignment INFORMATION OF TRANSMISSION SIDE NODE ITSELF

[RECEPTION SIDE skeleton]
STORE INFORMATION OF OPPOSITE NODE ATTRIBUTES OF skeleton object REPLY endian INFORMATION AND alignment INFORMATION OF RECEPTION SIDE NODE ITSELF

[TRANSMISSION SIDE proxy]
STORE endian INFORMATION AND alignment INFORMATION OF OPPOSITE NODE AS proxy ATTRIBUTES

FIG. 14

| offset | | type | VARIABLE NAME | | |
|---|---|---|---|---|---|
| 0 | ~ 3 | char | magic [4] | /* | FIX CHARACTER STRING OF "GIOP" */ |
| 4 | | octet | major_version; | /* | ENTER "1" FIXEDLY */ |
| 5 | | octet | minor_version; | /* | ENTER "1" FIXEDLY */ |
| 6 | | octet | flag | /* | 1:big-endian, 2:little-endian */ |
| 7 | | octet | message_type | /* | 8:alingment set */ |
| 8 | ~ 11 | unsigned long | message_size | | |
| 12 | | boolean | response_expected; | | |
| 13 | ~ 15 | octet | reserved [3] | /* | padding */ |
| 16 | ~ 19 | int | alingment_length; | /* | LENGTH OF alingment INFORMATION */ |
| | | octet | alingmeht [] ; | /* | alingment INFORMATION */ |

F I G. 1 5

[AT INITIALIZATION]

RESERVE RDMA AREA FOR TRANSMISSION, AND WIRE IT DOWN ON PHYSICAL MEMORY

[TRANSMISSION SIDE proxy]
ACQUIRE CDR AREA (ALLOCATE AREA AT INITIALIZATION)
CREATE REQUEST HEADER
CREATE REQUEST BODY
FILL UP MESSAGE LENGTH OF HEADER
TRANSMIT CONTENTS OF "buf" (BUFFER) BY RDMA
FREE CDR "buf" FOR RDMA AREA

FIG. 16

[AT INITIALIZATION OF PROGRAM]
  CREATE CERTAIN NUMBER OF THREADS AT TIME ON INITIALIZATION, AND HOLD THEM ON STANDBY IN SEMAPHORE

[RECEPTION SIDE skeleton]
  SELECT ONE OF THREADS OF STANDBY, DELIVER MESSAGE, AND UNLOCK THREAD
  CAUSE STANDING-BY THREAD TO CONTINUE PROCESSING OF MESSAGE
  CAUSE UNLOCKED THREAD TO ENTER NEXT REQUEST RECEPTION PROCESS

F I G. 1 7

```
[RECEPTION SIDE skeleton]
if (METHOD TO BE INVOKED BY REQUEST IS LIGHT) {
    INVOKE METHOD IN ORDER TO EXECUTE PROCESSING OF MESSAGE
        /*CAUSE THREAD ITSELF TO EXECUTE METHOD*/
} else {
    SELECT ONE OF THREADS ON STANDBY
    DELIVER MESSAGE, AND UNLOCK THREAD
}
ENTER NEXT REQUEST RECEPTION PROCESS

[STANDING-BY THREAD]
CAUSE UNLOCKED STANDING-BY THREAD TO CONTINUE PROCESSING OF MESSAGE INDEPENDENTLY OF RECEPTION THREAD
```

FIG. 18

| class NAME | method NAME or METHOD ID | light/heavy | POINTER TO FUNCTION |
|---|---|---|---|
| car | get_color<br>get_fuel_value<br>get_hight | light<br>heavy<br>light | &get_color( )<br>&get_fuel_value( )<br>&get_hight( ) |
| bycycle | get_color<br>get_hight | heavy<br>light | &get_color( )<br>&get_hight( ) |

FIG. 19

```
module method_table {
    interface granularity {
        void light( in string module,
                    in string interface,
                    in string method );
        void heavy( in string module,
                    in string interface,
                    in string method );
    };
};
```

FIG. 20

[TRANSMISSION PROGRAM SIDE]
INVOKE proxy FUNCTION    func( args )

[TRANSMISSION SIDE PROXY]
ACQUIRE CDR MANAGEMENT AREA
CREATE REQUEST HEADER (CONTAINING CONVERSION INTO CDR FORMAT)
CREATE REQUEST BODY (CONTAINING CONVERSION INTO CDR FORMAT)
FILL UP MESSAGE LENGTH OF HEADER
WIRE CDR "buf" (BUFFER) DOWN ON PHYSICAL MEMORY AS RDMA AREA
TRANSIT CONTENTS OF "buf" BY RDMA

FREE CDR AREA
STAND BY FOR REPLY

[RECEPTION SIDE RDMA DRIVER]
INTERRUPT UPON ARRIVAL OF MESSAGE

[RECEPTION SIDE skeleton]
INVERT HEADER FROM DATA SUBJECTED TO RDMA

SPECIFY OBJECT TO-BE-INVOKED

INVERT DATA SUBJECTED TO RDMA, FROM CDR FORMAT INTO "args" (ARGUMENTS)

SEARCH FOR FUNCTION TO-BE-INVOKED "func" ON BASIS OF METHOD NAME IN HEADER if ("func" WAS light()) {
  INVERT ARGUMENTS INTO CDR FORMAT
  SET CORRESPONDENT METHOD IN TABLE SHOWN IN FIG. 19, TO BE "light/heavy" COLUMN
  goto
  NEXT [RECEPTION SIDE skeleton]
} else {
  INVOKE THREAD FOR EXECUTING DESIGNATED "func", AND DELIVER "args" THERETO
}

F I G. 2 1

[RECEPTION SIDE PROGRAM]
EXECUTE "func" (FUNCTION)
STORE RETURN MESSAGE

[RECEPTION SIDE skeleton]
ACQUIRE CDR MANAGEMENT AREA
CREATE REPLY HEADER (CONTAINING CONVERSION INTO CDR FORMAT)
CREATE REPLY BODY (CONTAINING CONVERSION INTO CDR FORMAT)
SUBSTITUTE MESSAGE LENGTH OF HEADER WIRE CDR "buf" (BUFFER) DOWN ON PHYSICAL MEMORY AS RDMA AREA
TRANSMIT MESSAGE BY RDMA

FREE CDR AREA

[TRANSMISSION SIDE RDMA DRIVER]
INTERRUPT UPON ARRIVAL OF MESSAGE

[TRANSMISSION-SIDE REPLY ALLOTTING THREAD]
INVERT HEADER FROM DATA SUBJECTED TO RDMA
SPECIFY STANDING-BY thread ON BASIS OF request ID
ACTIVATE WAITING thread

[TRANSMISSION SIDE proxy]
INVERT CDR FORMAT INTO "args" (ARGUMENTS)

[TRANSMISSION SIDE PROGRAM]
INVOKE RESULT BY USE OF "args"

F I G. 2 2

[TRANSMISSION SIDE proxy]
TRANSMIT AREA SIZE DESIRED TO BE PREALLOCATED

[RECEPTION SIDE skeleton]
ACQUIRE BUFFER FOR RDMA AS DESIRED, AND WIRE IT DOWN

REPLY BUFFER TOKEN

[TRANSMISSION proxy]
STORE BUFFER TOKEN IN LIST

FIG. 23

| offset | type | | VARIABLE NAME | | |
|---|---|---|---|---|---|
| 0 ~ 3 | char | : | magic [4] | /* | FIX CHARACTER STRING OF "GIOP" */ |
| 4 | octet | : | major_version; | /* | ENTER "1" FIXEDLY */ |
| 5 | octet | : | minor_version; | /* | ENTER "1" FIXEDLY */ |
| 6 | octet | : | flag | /* | 1:big-endian, 2:little-endian */ |
| 7 | octet | : | message_type | /* | 9:buffer token request */ |
| 8 ~ 11 | unsigned long | : | message_size | | |
| | boolean | : | response_expected; | | |
| 12 | octet | : | reserved [3] | /* | padding */ |
| 13 ~ 15 | int | : | nkoken | /* | NUMBER OF token */ |
| 16 ~ 19 | int | : | buf_size [] | /* | SIZE OF BUFFER AS REQUESTED */ |

F I G. 24

```
offset    type              VARIABLE NAME

0  ~ 3    char            : magic [4]              /* FIX CHARACTER STRING OF "GIOP" */
4        octet           : major_version;         /* ENTER "1" FIXEDLY */
5        octet           : minor_version;         /* ENTER "1" FIXEDLY */
6        octet           : flag                    /* 1:big-endian,  2:little-endian */
7        octet           : message_type           /* 10: buffer token reply */
8  ~ 11  unsigned long   : message_size
12       boolean         : response_expected;
13 ~ 15  octet           : reserved [3]            /* padding */
16       int             : nkoken                  /* NUMBER OF token */
         int             : buf_addr []             /* RDMA ADDRESS OF ACQUIRED BUFFER */
         int             : buf_size []             /* SIZE OF ACQUIRED BUFFER */
```

F I G. 25

| SIZE OF BUFFER | NUMBER OF INITIALLY ACQUIRED TOKENS | NUMBER OF TOKENS JUDGED WANTING | ADDITIONAL UNIT NUMBER |
|---|---|---|---|
| 4 kbytes | 3 2 | 8 | 8 |
| 8 kbytes | 4 | 2 | 4 |
| 16 kbytes | 4 | 2 | 2 |
| ⋮ | | | |
| 2 Mbytes | 0 | 0 | 1 |

FIG. 26

```
[TRANSMISSION PROGRAM SIDE]
INVOKE proxy FUNCTION     func( args )

[TRANSMISSION SIDE PROXY]
    WIRE "args" (ARGUMENTS) DOWN ON PHYSICAL MEMORY
    CREATE REQUEST HEADER (CONTAINING CONVERSION INTO CDR FORMAT)
    if (NO BUFFER TOKEN EXISTS) {
        MAKE REQUEST FOR ADDITIONAL BUFFER TOKEN/*(TO BE EXPLAINED IN CONJUNCTION WITH FLOW SHOWN IN FIG. 29)*/
    }
    EMBED TOKEN INTO HEADER
    FILL UP MESSAGE LENGTH IF HEADER SELECT BUFFER TOKEN
    WRITE "args" INTO skeleton SIDE AREA INDICATED BY TOKEN
    TRANSMIT REQUEST HEADER BY RDMA STAND BY FOR REPLY      [RECEPTION SIDE RDMA DRIVER]
                            INTERRUPT UPON ARRIVAL OF MESSAGE

[RECEPTION SIDE skeleton]
                                INVERT HEADER FROM DATA SUBJECTED TO RDMA
                                SPECIFY OBJECT TO-BE-INVOKED SEARCH FOR FUNCTION TO-BE-INVOKED "func" ON BASIS OF METHOD NAME IN HEADER INVOKE THREAD FOR EXECUTING "func", AND DELIVER "args" THERETO
```

F I G. 2 7

```
[RECEPTION SIDE PROGRAM]
EXECUTE "func" (FUNCTION)
STORE RETURN MESSAGE

[RECEPTION SIDE skeleton]

WIRE REPLY AREA DOWN ON PHYSICAL MEMORY
CREATE REPLY HEADER
if (NO BUFFER TOKEN EXISTS) {
    MAKE REQUEST FOR ADDITIONAL BUFFER TOKEN
}
EMBED TOKEN INTO REPLY HEADER

FILL UP MESSAGE LENGTH OF HEADER

WRITE REPLY INTO proxy SIDE AREA INDICATED BY TOKEN

TRANSMIT REPLY HEADER BY RDMA

[TRANSMISSION SIDE RDMA DRIVER]
        INTERRUPT UPON ARRIVAL OF MESSAGE

[TRANSMISSION-SIDE REPLY ALLOTTING THREAD]
INVERT HEADER FROM DATA SUBJECTED TO RDMA
SPECIFY STANDING-BY thread ON BASIS OF request ID
ACTIVATE WAITING thread

[TRANSMISSION SIDE proxy]
SPECIFY BUFFER CONTAINING "args" (ARGUMENTS), ON BASIS OF TOKEN INFORMATION IN HEADER

[TRANSMISSION SIDE PROGRAM]
INVOKE RESULT BY USE OF "args"
```

F I G. 2 8

[TRANSMISSION SIDE proxy]
TRANSMIT AREA SIZE DESIRED TO BE PREALLOCATED

[RECEPTION SIDE skeleton]
INVERT HEADER FROM DATA SUBJECTED TO RDMA
ACQUIRE BUFFER FOR RDMA AS DESIRED, AND WIRE IT DOWN
TRANSMIT REPLY CONTAINING BUFFER TOKEN BY RDMA

[TRANSMISSION SIDE proxy]
ADD BUFFER TOKEN TO LIST

FIG. 29

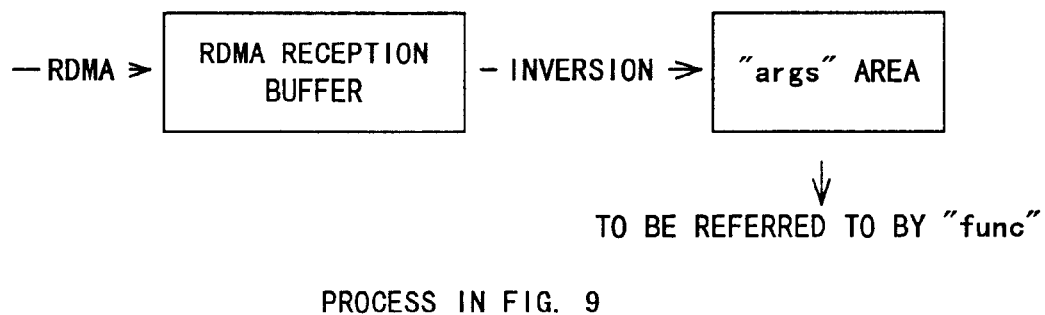
PROCESS IN FIG. 9
F I G. 3 0 A
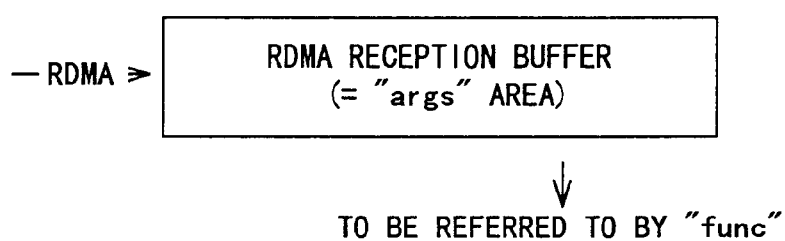
PROCESS IN FIG. 27
F I G. 3 0 B

FIG. 31A   PROCESS IN FIG. 9
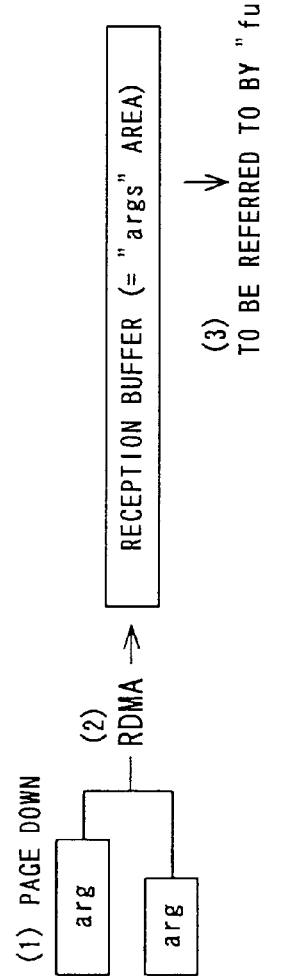
FIG. 31B   PROCESS IN FIG. 27

FIG. 32

```
[TRANSMISSION PROGRAM SIDE]
INVOKE proxy FUNCTION    func( args )

[TRANSMISSION SIDE PROXY]
    WIRE "args" (ARGUMENTS) DOWN ON PHYSICAL MEMORY
    CREATE REQUEST HEADER (CONTAINING CONVERSION INTO CDR FORMAT)
    if (NO BUFFER TOKEN EXISTS) {
        MAKE REQUEST FOR ADDITIONAL BUFFER TOKEN/*(TO BE EXPLAINED IN CONJUNCTION WITH FLOW SHOWN IN FIG. 29)*/
    }
    EMBED TOKEN INTO HEADER
    FILL UP MESSAGE LENGTH IF HEADER SELECT BUFFER TOKEN
    WRITE "args" INTO skeleton SIDE AREA INDICATED BY TOKEN
    TRANSMIT REQUEST HEADER BY RDMA STAND BY FOR REPLY    [RECEPTION SIDE RDMA DRIVER]
                          INTERRUPT UPON ARRIVAL OF MESSAGE

[RECEPTION SIDE skeleton]
                              INVERT HEADER FROM DATA SUBJECTED TO RDMA
                              SPECIFY OBJECT TO-BE-INVOKED
                              RELEASE WIRE-DOWN OF BUFFER INDICATED BY TOKEN, ON PHYSICAL MEMORY
                              SEARCH FOR FUNCTION TO-BE-INVOKED "func" ON BASIS OF METHOD NAME IN HEADER
                              INVOKE THREAD FOR EXECUTING "func", AND DELIVER "args" THERETO
```

FIG. 33

[RECEPTION SIDE PROGRAM]
EXECUTE "func" (FUNCTION)
STORE RETURN MESSAGE

[RECEPTION SIDE skeleton]

WIRE REPLY AREA DOWN ON PHYSICAL MEMORY
CREATE REPLY HEADER
if (NO BUFFER TOKEN EXISTS) {
    MAKE REQUEST FOR ADDITIONAL BUFFER TOKEN
    /*(TO BE EXPLAINED IN CONJUNCTION WITH FLOW SHOWN IN FIG. 29)*/
}
EMBED TOKEN INTO REPLY HEADER
FILL UP MESSAGE LENGTH OF HEADER

WRITE REPLY INTO proxy SIDE AREA INDICATED BY TOKEN

TRANSMIT REPLY HEADER BY RDMA

[TRANSMISSION SIDE RDMA DRIVER]
INTERRUPT UPON ARRIVAL OF MESSAGE

[TRANSMISSION-SIDE REPLY ALLOTTING THREAD]
INVERT HEADER FROM DATA SUBJECTED TO RDMA
SPECIFY STANDING-BY thread ON BASIS OF request ID
ACTIVATE WAITING thread

[TRANSMISSION SIDE proxy]
SPECIFY BUFFER CONTAINING "args" (ARGUMENTS), ON BASIS OF TOKEN INFORMATION IN HEADER
RELEASE WIRE-DOWN OF BUFFER ON PHYSICAL MEMORY

[TRANSMISSION SIDE PROGRAM]
INVOKE RESULT BY USE OF "args"

```
[TRANSMISSION PROGRAM SIDE]
INVOKE proxy FUNCTION      func( args )

[TRANSMISSION SIDE PROXY]
    WIRE "args" (ARGUMENTS) DOWN ON PHYSICAL MEMORY
    CREATE REQUEST HEADER (CONTAINING CONVERSION INTO CDR FORMAT)
    if (NO BUFFER TOKEN EXISTS) {
        MAKE REQUEST FOR ADDITIONAL BUFFER TOKEN/*(TO BE EXPLAINED IN CONJUNCTION WITH FLOW SHOWN IN FIG. 29)*/
    }
    EMBED TOKEN INTO HEADER
    FILL UP MESSAGE LENGTH IF HEADER SELECT BUFFER TOKEN
    WRITE "args" INTO skeleton SIDE AREA INDICATED BY TOKEN
    TRANSMIT REQUEST HEADER BY RDMA STAND BY FOR REPLY    [RECEPTION SIDE RDMA DRIVER]
                          INTERRUPT UPON ARRIVAL OF MESSAGE

RELEASE WIRE-DOWN OF BUFFER INDICATED BY TOKEN, ON PHYSICAL MEMORY

[RECEPTION SIDE skeleton]
                          INVERT HEADER FROM DATA SUBJECTED TO RDMA
                          SPECIFY OBJECT TO-BE-INVOKED
                          SEARCH FOR FUNCTION TO-BE-INVOKED "func" ON BASIS OF METHOD NAME IN HEADER
                          INVOKE THREAD FOR EXECUTING "func", AND DELIVER "args" THERETO
```

FIG. 34

[RECEPTION SIDE PROGRAM]
EXECUTE "func" (FUNCTION)
STORE RETURN MESSAGE

[RECEPTION SIDE skeleton]

WIRE REPLY AREA DOWN ON PHYSICAL MEMORY
CREATE REPLY HEADER
if (NO BUFFER TOKEN EXISTS) {
    MAKE REQUEST FOR ADDITIONAL BUFFER TOKEN
        /*(TO BE EXPLAINED IN CONJUNCTION WITH FLOW SHOWN IN FIG. 29)*/
}
EMBED TOKEN INTO REPLY HEADER
FILL UP MESSAGE LENGTH OF HEADER

WRITE REPLY INTO proxy SIDE AREA INDICATED BY TOKEN

TRANSMIT REPLY HEADER BY RDMA

[TRANSMISSION SIDE RDMA DRIVER]
INTERRUPT UPON ARRIVAL OF MESSAGE
RELEASE WIRE-DOWN OF BUFFER ON PHYSICAL MEMORY

[TRANSMISSION-SIDE REPLY ALLOTTING THREAD]
INVERT HEADER FROM DATA SUBJECTED TO RDMA
SPECIFY STANDING-BY thread ON BASIS OF request ID
ACTIVATE WAITING thread

[TRANSMISSION SIDE proxy]
SPECIFY BUFFER CONTAINING "args" (ARGUMENTS), ON BASIS OF TOKEN INFORMATION IN HEADER

[TRANSMISSION SIDE PROGRAM]
INVOKE RESULT BY USE OF "args"

FIG. 35

```
[TRANSMISSION PROGRAM SIDE]
INVOKE proxy FUNCTION    func( args )

[TRANSMISSION SIDE PROXY]
    WIRE "args" (ARGUMENTS) DOWN ON PHYSICAL MEMORY
    CREATE REQUEST HEADER (CONTAINING CONVERSION INTO CDR FORMAT)
    if (NO BUFFER TOKEN EXISTS) {
        MAKE REQUEST FOR ADDITIONAL BUFFER TOKEN/*(TO BE EXPLAINED IN CONJUNCTION WITH FLOW SHOWN IN FIG. 29)*/
    }
    EMBED TOKEN INTO HEADER
    FILL UP MESSAGE LENGTH IF HEADER SELECT BUFFER TOKEN
    WRITE "args" INTO skeleton SIDE AREA INDICATED BY TOKEN
    TRANSMIT REQUEST HEADER BY RDMA if (NUMBER OF TOKENS IN LIST IS SMALLER THAN CERTAIN VALUE) {
        MAKE REQUEST FOR ADDITIONAL BUFFER TOKEN
    }

STAND BY FOR REPLY    [RECEPTION SIDE RDMA DRIVER]
                          INTERRUPT UPON ARRIVAL OF MESSAGE

[RECEPTION SIDE skeleton]
                              INVERT HEADER FROM DATA SUBJECTED TO RDMA
                              SPECIFY OBJECT TO-BE-INVOKED
                              RELEASE FIXATION OF BUFFER INDICATED BY TOKEN, ON PHYSICAL MEMORY
                              SEARCH FOR FUNCTION TO-BE-INVOKED "func" ON BASIS OF METHOD NAME IN HEADER
                              INVOKE THREAD FOR EXECUTING "func", AND DELIVER "args" THERETO
```

FIG. 36

```
[RECEPTION SIDE PROGRAM]
EXECUTE "func" (FUNCTION)
STORE RETURN MESSAGE

[RECEPTION SIDE skeleton]

WIRE REPLY AREA DOWN ON PHYSICAL MEMORY
CREATE REPLY HEADER
if (NO BUFFER TOKEN EXISTS) {
    MAKE REQUEST FOR ADDITIONAL BUFFER TOKEN
        /*(TO BE EXPLAINED IN CONJUNCTION WITH FLOW SHOWN IN FIG. 29)*/
}
EMBED TOKEN INTO REPLY HEADER
FILL UP MESSAGE LENGTH OF HEADER

WRITE REPLY INTO proxy SIDE AREA INDICATED BY TOKEN

TRANSMIT REPLY HEADER BY RDMA

[TRANSMISSION SIDE RDMA DRIVER]
INTERRUPT UPON ARRIVAL OF MESSAGE

[TRANSMISSION-SIDE REPLY ALLOTTING THREAD]
INVERT HEADER FROM DATA SUBJECTED TO RDMA
SPECIFY STANDING-BY thread ON BASIS OF request ID
ACTIVATE WAITING thread

[TRANSMISSION SIDE proxy]
SPECIFY BUFFER CONTAINING "args" (ARGUMENTS), ON BASIS OF TOKEN INFORMATION IN HEADER

[TRANSMISSION SIDE PROGRAM]
INVOKE RESULT BY USE OF "args"
```

FIG. 37

COMPUTER HAVING A REMOTE PROCEDURE CALL MECHANISM OR AN OBJECT REQUEST BROKER MECHANISM, AND DATA TRANSFER METHOD FOR THE SAME

BACKGROUND OF THE INVENTION

1. Field of the Invention

The present invention relates broadly to a distributed computing environment (DCE), and particularly to a computer having a remote procedure call (RPC) mechanism or an object request broker (ORB) mechanism. More specifically, it relates to a computer for use in a system which has a system area network (SAN) as the physical communication channel between computers, and in which the data in a storage area of a physical memory of the transmission side computer can be directly transferred to a storage area of a physical memory of the reception side computer by utilizing a remote direct memory access (RDMA) mechanism included in the SAN.

2. Description of the Related Art

The ORB or RPC is a mechanism for invoking methods and functions among computers, namely, nodes in a distributed computing environment. The ORB is employed in, for example, one of the standards of those communication channels among distributed objects which are collectively called "CORBA (common object request broker architecture)". The standard is a business standard established by the Object Management Group (OMG), and is extensively adopted by various vendors such as Sun Microsystems Inc., International Business Machines Corp., Digital Equipment Corp., and Netscape Communications Corp.

The ORB acts between a client and an object in such a manner that the request of the client is conveyed to the object so as to execute an operation, and that, if necessary, the object sends any result back to the client.

FIG. 1 is a diagram showing a prior-art example of the scheme of the ORB or RPC. In the prior art, nodes which use the ORB or RPC are connected to a packet type communication network. With the network, a request for remote invocation is sent after being divided or disassembled into packets which conform to, for example, the UDP (user datagram protocol) or the TCP/IP (transmission control protocol/internet protocol) being the standard protocol(s) of the Internet. For this reason, processing for the division into the packets and the restructuring or reassembling of the request and processing for hardware interruption are executed by a TCP/IP processing unit which is included in an operating system (OS). In a case where the RPC employs the UDP, similar processing items are executed by an RPC library. A network interface card (NIC) and a switching mechanism can be simplified by dividing the request into the packets as stated above. Accordingly, the ORB and RPC can be favorably utilized in networks which range from a LAN (local area network) to a WAN (wide area network) extensively.

With the ORB or RPC, data to be sent out to the network are converted into a standard data representation format, for example, the XDR (external data representation) format of the SunRPC or the CDR (common data representation) format of the CORBA in order that functions can be invoked even among the nodes of different internal data representation formats and among different languages.

In recent years, hardware called the "system area network (SAN)" has come into use instead of the network employing the packets. The SAN has the feature that the node of a transmission side can write data directly into the physical memory of the destination node, and the feature that the reliable transmission and reception of data are guaranteed in hardware processing. A SAN program transmits data by storing the data to-be-transmitted in physical main storage, and giving the network interface card (NIC) a transmission start instruction which designates the location of the transmission data and the location of a reception buffer existing on the physical main storage of the receiving node. Accordingly, high-speed processing is realized.

With the SAN, the reliabilities of fiber and wire being network media are enhanced by imposing geographical restrictions, for example, the maximum transmission path length and "one floor", on a system area, and the NIC is made intelligent, whereby high-speed data transfer is realized. In the data transfer, the NIC operates as a DMA (direct memory access) controller. More specifically, the CPU (central processing unit) of the transmission node issues a data transfer instruction to the NIC by designating the addresses of the transfer source and destination, whereby a remote direct memory access (RDMA) operation is executed. The point of difference of the RDMA from the ordinary DMA is that the identifier of the node is contained in the address. If the identifier of the node indicates the particular transmission node itself, the action of the DMA going out of the particular node and coming back to the same is performed, and the NIC operates simply as a DMA controller.

Heretofore, the SAN has been used as a message passing interface (MPI), the data stream (one pipe through which data flows) model of a parallel virtual machine (PVM) or the like, or a shared memory. Such an element is chiefly employed in the field of scientific and technological computations.

Here will be explained a prior-art example of remote call processing in the CORBA, and so forth.

FIGS. 2 and 3 are diagrams for explaining the flow of the remote call processing. Referring to FIG. 2, on a transmission side, a proxy function is invoked by a program. A transmission side proxy creates the header and body of a request and converts them into the CDR format, and it sends the request from a socket to a TCP/IP stack. This stack divides the message of the request into packets, and sends out the packets to a network.

On a reception side, the packets are restructured or reassembled into the message by a TCP/IP stack. A reception side skeleton specifies an object to-be-invoked and inverts the CDR format into arguments. Besides, it searches for a function to-be-invoked. Further, it invokes a thread for executing the function and delivers the values of the arguments necessary for the execution of the function, to the thread.

Referring to FIG. 3, the function (arithmetic operation) is executed by a reception side program. In the presence of a reply message to the request transmission side, for example, the result of the execution of the function, the reception side skeleton creates the header and body of the reply and sends the message from a socket to the reception side TCP/IP stack, which divides the message into packets and sends out the packets to the network.

In the transmission side TCP/IP stack, the packets are restructured into the message. Subsequently, a transmission-side reply allotting thread specifies a standing-by thread and activates the thread. The transmission side proxy inverts the CDR format into arguments, and the transmission side program invokes the result by the use of the arguments.

FIG. 4 is a diagram for explaining a prior-art example of a method for acquiring a CDR area. The structure of a CDR management area and the pseudo-code of the CDR are illustrated in the figure.

FIG. 5 is a diagram showing the structure of a request message. A "big-endian" and a "little-endian" for an offset value of 6 (six) as indicated in the figure will be explained later.

FIG. 6 is a diagram showing the structure of an object key. The name of a host in which an object exists, a TCP port number which accepts a service, etc. are illustrated in the figure.

As explained above, a computer having the ORB mechanism or RPC mechanism employs the packet mode in the communications between the nodes, and it has therefore involved the problem that a long time is expended on the processing for the division of the data into the packets and the restructuring of the packets into the data. Further, a hardware interrupt is required on the reception side at the arrival of every packet, so that the packet division/restructuring processing, the interrupt processing, the processing for conversion into a standard data format, etc. occupy a larger proportion in the overall delay of the data transfer, as the transmission speed of the network further increases. This has led to the problem that, even when only the network media are contrived so as to increase the data transfer speeds thereof, the increased speeds cannot be fully exploited for the communications. By way of example, a data transfer speed of only 300 Mbps or so can be realized in the Ethernet which has a transfer speed in the order of Gbps.

Moreover, the ORB or RPC is structurally premised on using the TCP or UDP in a lower layer underlying it. Therefore, even when the SAN having appeared in place of the packet switched network is employed, it is used only as the packet transfer network or the data stream model. This has led to the problem that the features of the SAN mentioned before cannot be utilized.

SUMMARY OF THE INVENTION

In consideration of the technical background stated above, the present invention has for its object to shorten a delay which is expended on the data transfer between computers each having an ORB or RPC mechanism, in such a way that the remote direct memory access (RDMA) inherent in the SAN is utilized for the data transfer.

According to one aspect of performance of the present invention, a computer having a remote procedure call (RPC) mechanism or an object request broker (ORB) mechanism in a distributed computing environment is constructed comprising a physical memory, a data readout unit which reads out data stored in the physical memory, and a remote direct memory access unit which transfers the data read out by the data readout unit, directly to a physical memory included in a communicating opposite computer connected to the particular computer itself through a network.

In this aspect of performance, the remote direct memory access unit acts between the computers each having the RPC mechanism or ORB mechanism, so as to perform a remote direct memory access (RDMA) operation, that is, an operation in which the data read out of the physical memory of the particular computer itself is directly transferred to the physical memory of the communicating opposite computer without the intervention of CPUs (central processing units) or the main arithmetic units of the respective computers. It is therefore possible to shorten a delay which is expended on the data transfer between the computers.

Heretofore, the CDR has been employed as a common data format in, for example, the CORBA, and data has been infallibly converted into the common data format before the transmission thereof. In contrast, according to another aspect of performance of the present invention, in a case where the formats of data representation in the computers on a transmission side and a reception side are the same, it is possible to omit the conversion into the common data format and to transfer the data left in the data representation format of the transmission side computer.

In this regard, each computer, for example, can further comprise a data-representation-format management unit which manages the data representation formats of the individual computers connected to the network. Thus, the conversion between the data representation formats can be omitted in correspondence with the contents of the management unit.

According to a further aspect of performance of the present invention, in a case where the data representation formats of the particular computer itself and the opposite computer are different, it is possible to convert the transfer data into the data representation formats of the opposite computer on the transmission side and to transfer the resulting data. Also herein, the data-representation-format management unit mentioned above can be further comprised so as to transfer the data subjected to the representation format conversion in accordance with the managed contents.

According to yet another aspect of performance of the present invention, each computer can further comprise a data format conversion unit by which, when the data representation formats of the particular computer itself and the opposite computer are different, the particular computer converts data transferred from the opposite computer, into the data representation format of its own and then stores the resulting data in the physical memory area of its own. In this regard, it is also possible that the remote direct memory access unit of the transmission side transfers a message containing the transfer data, by affixing the data representation format of the particular computer thereto beforehand, while the data format conversion unit of the reception side converts the data to-be-transferred into the affixed data representation format.

According to a further aspect of performance of the present invention, the computer can also comprise a data-representation-format notification unit by which, in starting the communication connection between the computers, the data representation format of the particular computer itself is notified to the opposite computer.

According to a still further aspect of performance of the present invention, the computer can also transfer data toward the opposite computer in a state where an area designated by, for example, arguments for a function is wired down on the physical memory without being freed, in order that the data on the physical memory area of the particular computer itself may be prevented from being saved in the secondary storage area thereof for virtual storage during the data transfer.

According to a different aspect of performance of the present invention, the computer can further comprise a data delivery unit by which a storage area for data transferred from the remote direct memory access unit of the opposite computer and stored in a previously-wired-down physical memory area, the data storage area being left intact, is delivered to a function/method that is to be executed by the particular computer itself. Herein, the computer can further comprise a memory-wire-down release unit by which the wire-down of the storage area for the data on the physical memory area, the transfer of the data from the opposite computer having been completed, is released in advance of the delivery of the received function/method to the data delivery unit.

According to a still different aspect of performance of the present invention, the computer can further comprise an interrupt processing unit which generates a hardware interrupt upon the arrival of a message containing transfer data and sent from the opposite computer, and which itself executes the processing of a function/method that is processed using the transfer data, on condition that the load of the processing of the function/method is light.

As described above, according to the present invention, the data in the physical memory area of the particular computer itself can be directly transferred toward the physical memory area of the communicating opposite computer through the network which is, for example, a system area network.

BRIEF DESCRIPTION OF THE DRAWINGS

The present invention will be more apparent from the following detailed description, when taken in conjunction with the accompanying drawings, in which:

FIG. 2 illustrates the first half of the flow of remote procedure call processing in a prior-art example;

FIG. 4 illustrates a method for acquiring a CDR area in the prior-art example;

FIG. 5 illustrates the structure of a request message;

FIG. 6 illustrates the structure of an object key;

FIG. 7 is a block diagram showing the fundamental construction of the present invention;

FIG. 9 illustrates the first half of the flow of remote procedure call processing in the first aspect of performance of the present invention;

FIGS. 11A, 11B, 11C and 11D illustrate different data representation formats ascribable to discrepancies in endians and alignments;

FIG. 12 illustrates an example of a table which lists data representation formats etc. in respective nodes;

FIG. 13 illustrates the flow of the processing of a connection establishing procedure in a usual mode;

FIG. 14 illustrates the flow of data-representation-format interchange processing which is executed immediately after the establishment procedure shown in FIG. 13;

FIG. 15 illustrates the structures of messages which are exchanged in the data-representation-format interchange processing shown in FIG. 14;

FIG. 16 illustrates the flow of processing in the case where an RDMA area for transmission is wired down on a physical memory beforehand;

FIG. 17 illustrates the detailed flow of processing in which a thread for executing a function is invoked and has arguments delivered thereto;

FIG. 18 illustrates the flow of processing in the case where an interrupt processing thread or a reception side thread itself executes the processing of a function/method;

FIG. 19 illustrates an example of a table for registering whether or not the processing loads of methods are light;

FIG. 20 illustrates an example of a method which is invoked by a command, and for which a user wants to set light or heavy processing;

FIG. 21 illustrates the first half of the flow of remote procedure call processing in the second aspect of performance of the present invention;

FIG. 22 illustrates the latter half (succeeding to the flow in FIG. 21) of the flow of the remote procedure call processing in the second aspect of performance of the present invention;

FIG. 23 illustrates the flow of buffer token request processing;

FIG. 24 illustrates an example of the structure of a buffer request message;

FIG. 25 illustrates an example of the structure of a message replying to the buffer request message;

FIG. 26 illustrates an example of an acquisitional-buffer management table for managing the numbers of buffer tokens;

FIG. 27 illustrates the first half of the flow of remote procedure call processing in the third aspect of performance of the present invention;

FIG. 28 illustrates the latter half (succeeding to the flow in FIG. 27) of the flow of the remote procedure call processing in the third aspect of performance of the present invention;

FIG. 29 illustrates the flow of buffer-token additional request processing;

FIGS. 30A and 30B illustrate operations in each of which a reception data storage area left intact is delivered to a function/method in a reception side node;

FIGS. 31A and 31B illustrate those operations in transmission side nodes which correspond to the operations in FIGS. 30A and 30B, respectively;

FIG. 32 illustrates the first half of the flow of remote procedure call processing in the fourth aspect of performance of the present invention;

FIG. 33 illustrates the latter half (succeeding to the flow in FIG. 32) of the flow of the remote procedure call processing in the fourth aspect of performance of the present invention;

FIG. 34 illustrates the first half of the flow of remote procedure call processing in the fifth aspect of performance of the present invention;

FIG. 35 illustrates the latter half (succeeding to the flow in FIG. 34) of the flow of the remote procedure call processing in the fifth aspect of performance of the present invention;

FIG. 36 illustrates the first half of the flow of remote procedure call processing in the sixth aspect of performance of the present invention;

FIG. 37 illustrates the latter half (succeeding to the flow in FIG. 36) of the flow of the remote procedure call processing in the sixth aspect of performance of the present invention;

DESCRIPTION OF THE PREFERRED EMBODIMENTS

Figure 1:
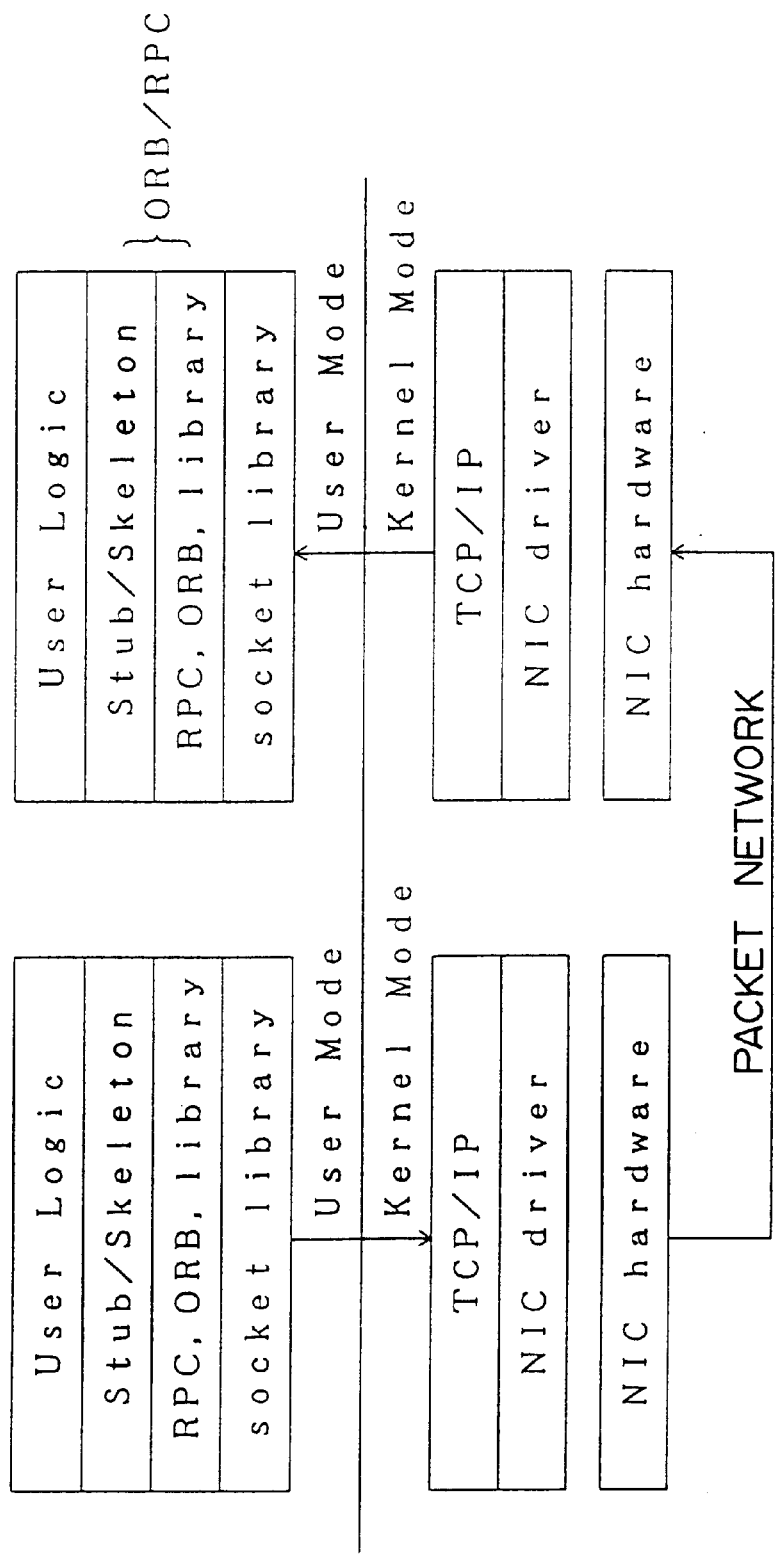
FIG. 1 illustrates a prior-art example of the scheme of object request broker (ORB) processing or remote procedure call (RPC) processing.

FIG. 7 is a block diagram showing the fundamental construction of the present invention. It illustrates the fundamental configuration of computers 3 each of which has a remote procedure call (RPC) mechanism 1 or an object request broker (ORB) mechanism 2 in a distributed computing environment.

Referring to FIG. 7, a physical memory 4 is the main storage of the computer 3.

A data readout unit 5 reads out data stored in the physical memory 4, and delivers the data to a remote direct memory access unit (or a remote direct data transfer unit) 6.

The remote direct memory access unit 6 performs a remote direct memory access (RDMA) operation in which the data read out of the physical memory 4 by the data readout unit 5 is not transferred through a CPU being the main arithmetic unit of the particular computer 3 (including this RDMA unit 6), but it is directly transferred to the physical memory 4 included in the computer 3 of the opposite communication side connected to the particular computer 3 through a network 7.

By the way, in the illustrated fundamental construction, the network 7 through which the computers 3 are interconnected is the so-called "system area network (SAN)". The data transfer by the RDMA unit 6 is effected using the SAN 7 as a physical communication channel.

Figure 8:
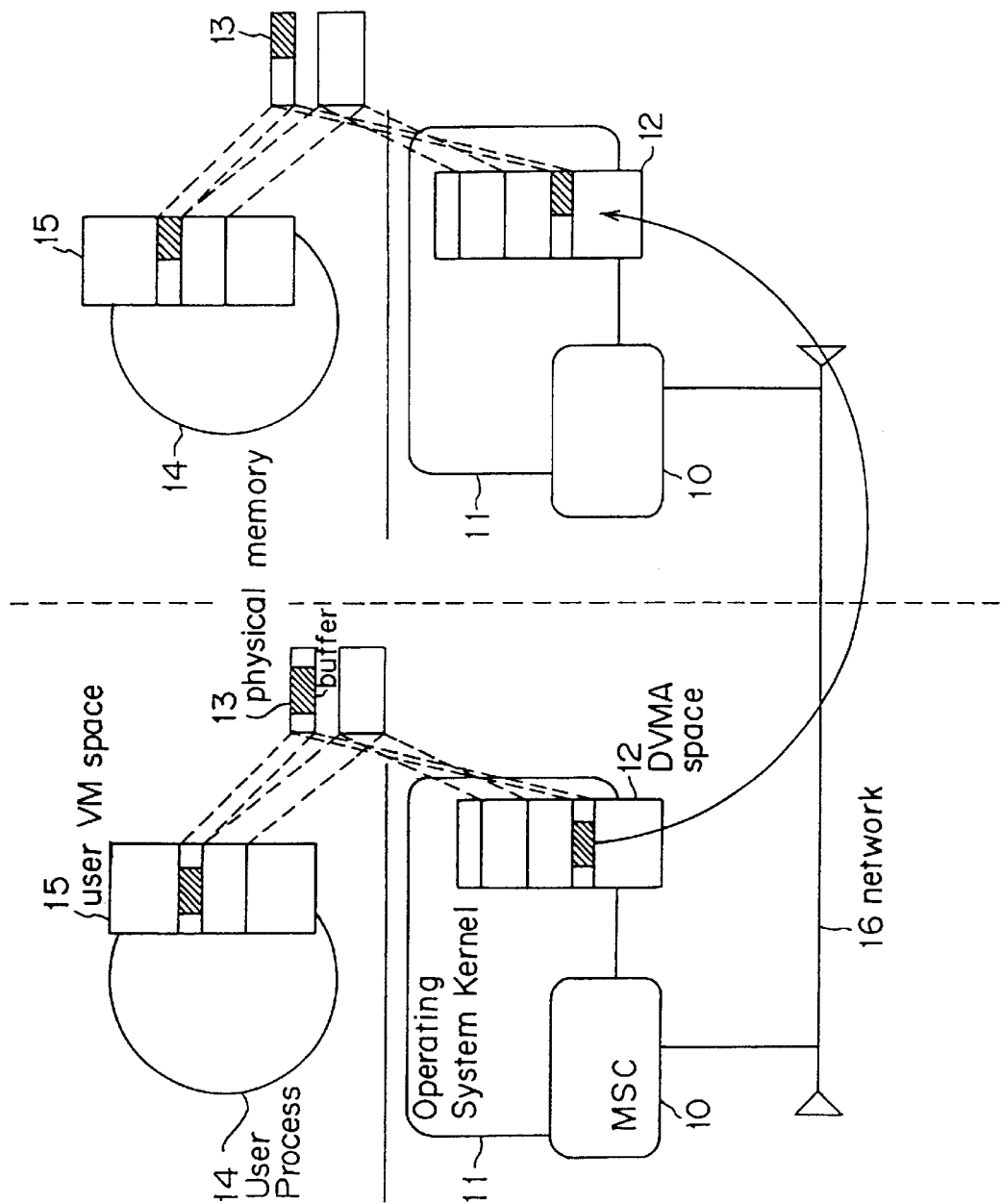
FIG. 8 illustrates the situation of data transfer based on remote direct memory access as is performed by a message controller.

FIG. 8 exemplifies the situation of data transfer based on the remote direct memory access (RDMA) as is performed by a message controller (MSC) 10 acting as a network interface for use in the computer of the present invention. In the illustrated example, the RDMA by the MSC 10 is effected in such a way that the following instruction is issued to the MSC 10 by the CPU of the computer:

SEND (Transfer-source memory area, Transfer destination node, Transfer-destination memory area)

Each of the memory areas of the transfer source (source node) and the transfer destination (destination node) in the instruction is designated by the head address and length of an area which is contained in the direct virtual memory access (DVMA) space 12 of an operating system kernel 11. The "DVMA space 12" is a virtual memory space as viewed from the I/O device of the computer, and a physical memory 13 can be mapped on this space. The CPU can freely alter the map as may be needed.

Accordingly, before the above SEND instruction is issued, the CPUs on the transmission side and on the reception side need to map on the DVMA space 12 the physical memory 13 for storing data to-be-transmitted and the physical memory 13 for accepting data to-be-received, respectively, in order that the MSCs 10 may be permitted to read and write the data from and into the physical memories 13.

On the other hand, the same physical memory 13 can be mapped on the virtual memory space of a user process 14, that is, on a user VM space 15. The user VM space 15 is capable of mapping between it and the physical memory 13, independently of the mapping between the DVMA space 12 and the physical memory 13 on the side of the operating system kernel 11. The communications between the CPUs can be established by mapping the same physical memories 13 in the user VM space 15 and the DVMA space 12, respectively.

The transmission side CPU writes the data into the physical memory 13, and thereafter issues the SEND instruction. The data is transferred between the nodes of the transmission and reception sides and to the physical memory 13 on the reception side through a network 16 by the RDMA. The reception side CPU loads the data from the physical memory 13.

Figure 10:
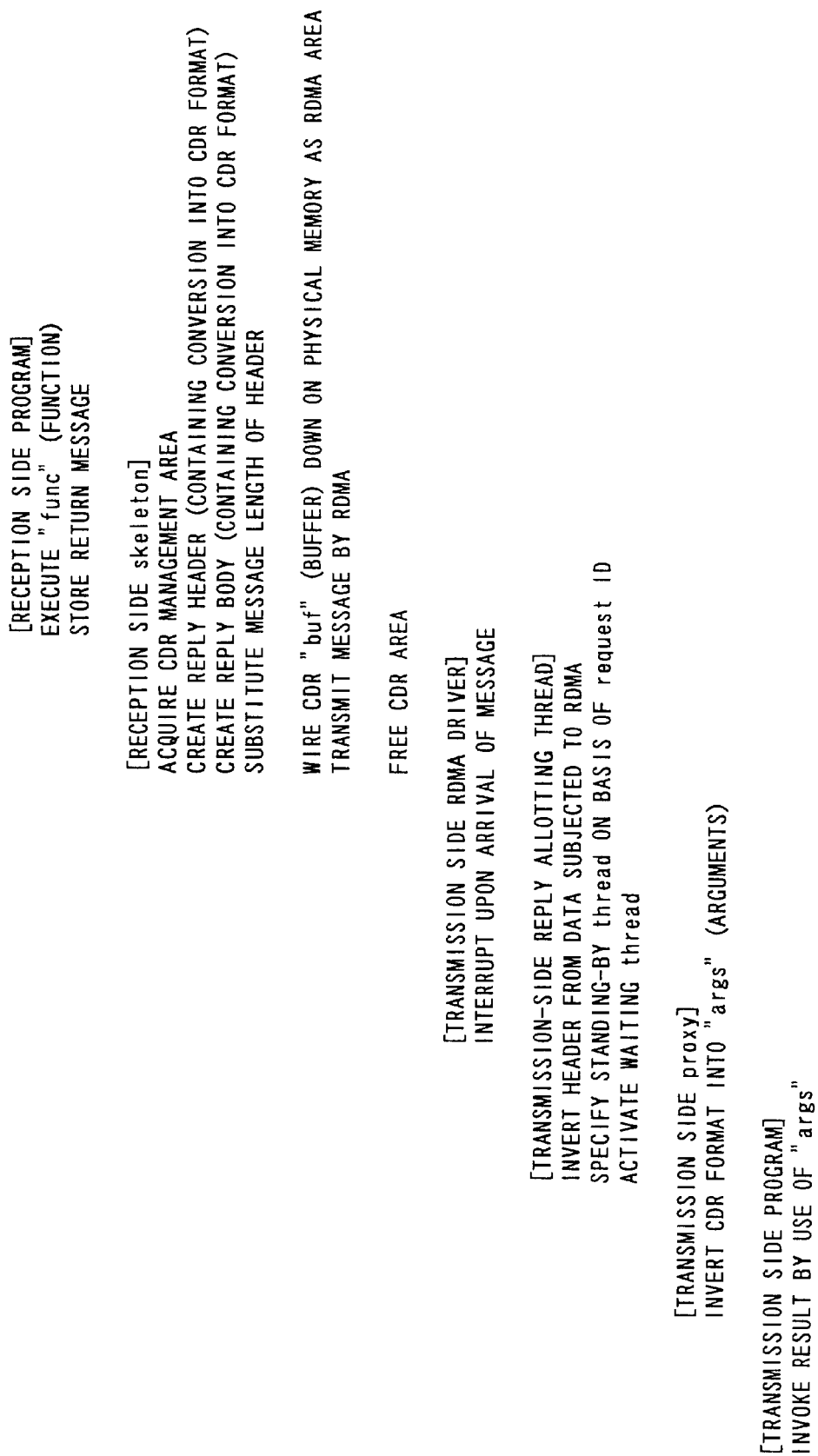
FIG. 10 illustrates the latter half (succeeding to the flow in FIG. 9) of the flow of the remote procedure call processing in the first aspect of performance of the present invention.

FIGS. 9 and 10 illustrate the flow of remote procedure call processing in the CORBA as the first aspect of performance of the present invention. When compared with the prior-art example in FIG. 2, the flow in FIG. 9 differs in the point that, on the transmission side, transmission processing based on the RDMA is executed instead of the data transmission by the socket and the TCP/IP stack.

In the transmission proxy, the header and body of a request are created including the conversion of transfer data into the CDR format. Subsequently, unlike the flow of FIG. 2, the flow of FIG. 9 proceeds such that a CDR buffer is reserved and wired down (fixed) as an RDMA area in a certain area on a physical memory (this operation shall be termed the "wire-down of the CDR buffer on the physical memory area"), whereupon the contents of the buffer are transmitted in accordance with the RDMA.

On the reception side, the flow of FIG. 9 differs from the prior-art example of FIG. 2 in that an RDMA driver generates an interrupt upon the arrival of the message, thereby to start processing. Excepting the point that the data subjected to the RDMA is used, processing by the reception side skeleton is basically the same as in FIG. 2.

Figure 3:
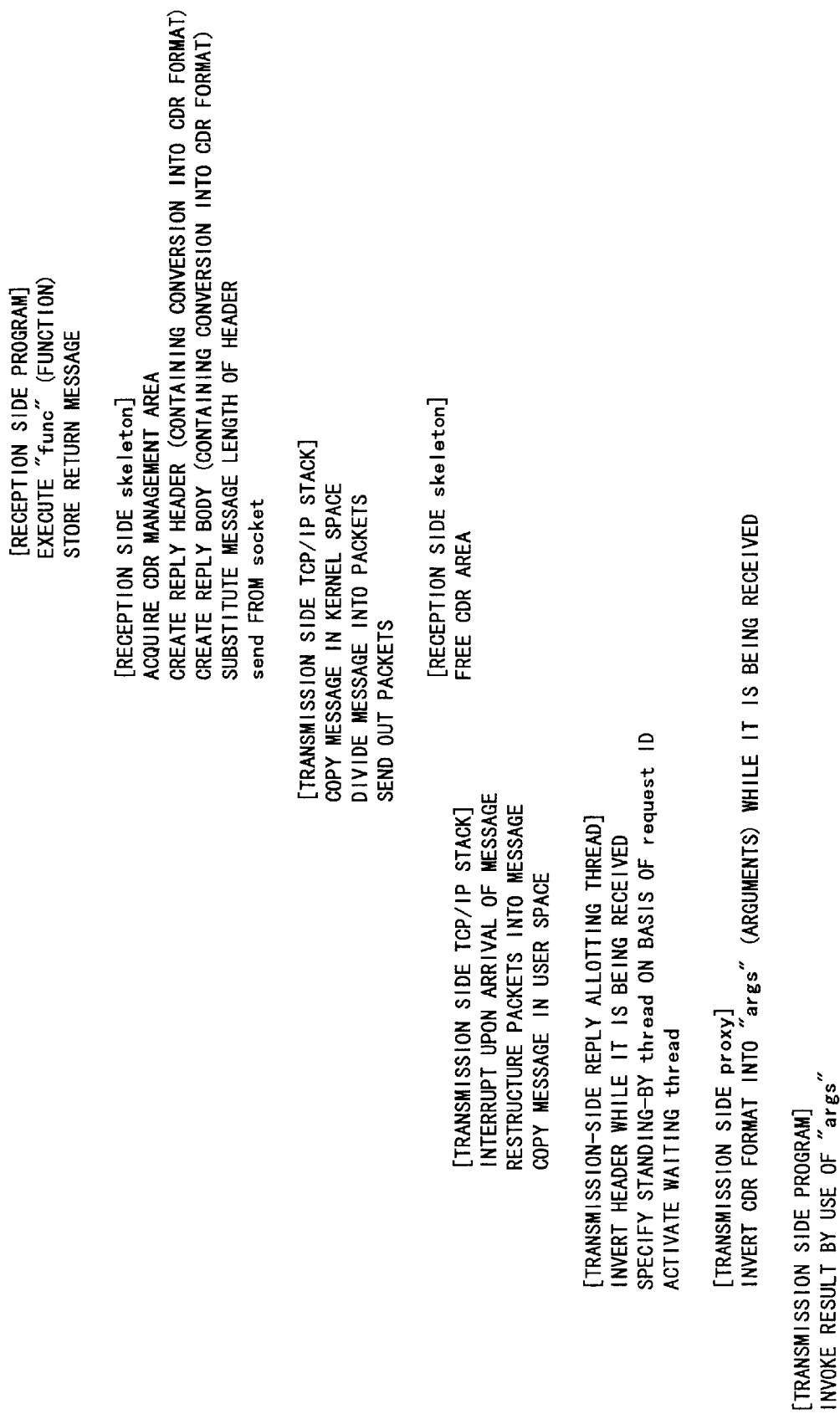
FIG. 3 illustrates the latter half (succeeding to the flow in FIG. 2) of the flow of the remote procedure call processing in the prior-art example.

The flow in FIG. 10 differs from the flow in FIG. 3 as regards the processing in the case where a function (arithmetic operation) is executed by the reception side program and where a reply message is to be sent from the reception side, in the following two points: First, in the reception side skeleton, after the creation of the header and body of the reply and the wire-down of a CDR buffer as an RDMA area on a physical memory area, the message is transferred in accordance with the RDMA, and the CDR area is freed from wire down. Secondly, a transmission side RDMA driver generates upon the arrival of the message, in place of the TCP/IP stack.

As stated before, with the ORB or RPC in the prior art, data is converted into the common data format in advance of transmission in order to absorb the discrepancy between the representation formats of data in the transmission node and reception node, the discrepancy between endians, in other words, between the representation formats of multiple-byte numerical values on the memories, and so forth. In the case of the CORBA, the data format CDR or SunRPC is converted into the XDR.

FIGS. 11A, 11B, 11C and 11D serve to explain the different representation formats of numerical data on the memories as are attributed to discrepancies in endians and alignments. Concretely, the different representation formats of an object exemplified in FIG. 11A, on the memories are illustrated in FIGS. 11B, 11C and 11D.

According to the first aspect of performance of the present invention, in a case where the data representation formats, the endians etc. have been found the same in the nodes (processes) of the transmission side and reception side, data is subjected to the RDMA without being converted into the common data format.

Besides, according to the first aspect of performance of the present invention, in a case where the data representation formats, etc. are different between the process of the transmission side and that of the reception side, it is possible that data is converted into the data representation format of the reception side process on the transmission side, whereupon the resulting data is transferred in accordance with the RDMA. Conversely, it is possible that data is transferred in accordance with the RDMA without performing the conversion between the data representation formats on the transmission side, and that the reception side converts the received data into the representation format of its own. In this regard, the data-representation-format converting operation on the reception side can be promoted in such a way that the transmission side sends a message containing the transfer data, by affixing the data representation format of its own node thereto beforehand.

Also, according to the first aspect of performance of the present invention, it is possible that the data items, such as data representation formats, of the individual computers connected to the network can be retained in the form of a table, and that the data format converting operation can be altered by the node of the transfer source or destination of a message. FIG. 12 illustrates an example of such a table listing the data representation formats etc. in the individual nodes. Concretely, the figure indicates different endians and alignment types in correspondence with node addresses. Such a table shall be created by the administrator of the system area network (SAN) beforehand and retained in all the nodes.

Further, according to the first aspect of performance of the present invention, in order to adjust the different data representation formats as stated above, the data representation formats of the respective nodes can be exchanged in starting the connection between these nodes, thereby to perform the converting operation for the data representation formats in accordance with the exchanged contents. Processing at the start of the connection will be described with reference to FIGS. 13, 14 and 15.

FIG. 13 illustrates the flow of the processing of a connection establishing procedure in a usual mode. First, a destination object key is delivered in the transmission side program. Subsequently, in the transmission side proxy, the host name and port name of the destination are extracted from the key, and a connection establishing request is made in the absence of any connection to the port of the extracted port name. The connection establishing request is sent to the reception side by a TCP/IP stack, and a connection acceptance reply is received from the reception side, whereby the establishment of the connection is completed. Incidentally, although the connection establishment processing has been exemplified here as being executed through a packet network by the TCP/IP stack, it is a matter of course that similar processing can be executed in accordance with the RDMA employing the SAN.

FIG. 14 illustrates the processing flow of a data-representation-format interchanging operation which proceeds immediately after the establishment procedure shown in FIG. 13. The transmission side proxy transmits the endian information and alignment information of the corresponding node itself, and receives the endian information and alignment information from the opposite node. Thus, the endian information and alignment information are interchanged.

FIG. 15 illustrates the structures of messages which are exchanged in the processing shown in FIG. 14. Each of the messages contains the endian information, the length of the alignment information, and the alignment information itself.

As explained before, the node of the transmission side sometimes converts the representation format of data into the common data format, for example, the CDR format in the CORBA, or into the data representation format employed in the node of the reception side. In this case, a wired-down area in which the converted data is to be stored can be reserved on the physical memory beforehand. Thus, the processing for wiring down on the physical memory area every RDMA operation can be dispensed with unlike the case where, after creating the header and body of the request and converting them into the CDR format, the CDR buffer is wired down on the physical memory area. Moreover, the wire-down area can be utilized again after the end of one request, and an area having been collectively wired down at the time of the initialization of the ORB or RPC can be utilized many times.

FIG. 16 illustrates the flow of processing in the case where an RDMA area for transmission is previously wired down in the physical memory as stated above. Referring to the figure, the RDMA area for transmission is reserved and is wired down on the physical memory area at the time of the initialization of, for example, the ORB. Thereafter, processing similar to the processing shown in FIG. 9 is executed, but the processing of the transmission side proxy is somewhat different from that shown in FIG. 9. Concretely, in acquiring a CDR management area, the area reserved at the initialization is allocated to the CDR area. Besides, the header and body of a request are created, and the contents of the buffer are transferred in accordance with the RDMA. Thereafter, the area acquired as the CDR buffer is freed as an area which will possibly be subsequently utilized as a subject for the RDMA. Then, the processing of the transmission side proxy is ended.

Next, according to the present invention, when it is certain that the processing of a function/method, which the node of the reception side executes using data transferred from the transmission side in accordance with the RDMA, ends in a short time, an interrupt processing thread generating a hardware interrupt upon the arrival of a message, or a message receiving thread itself can process the function/method, in place of the operation of the reception side skeleton for invoking a new thread which executes the function/method. Thus, it is dispensed with to activate a new thread for processing the message and to switch the processing. Processing in this case will be described as the second aspect of performance of the present invention.

More specifically, the processing "a thread for executing the function is invoked, and the arguments are delivered thereto" indicated in FIG. 9, which proceeds at the last of the processing of the reception side skeleton after the message arrival interrupt by the reception side RDMA driver, is altered in the second aspect of performance. FIG. 17 illustrates the detailed flow of the processing "a thread for executing the function is invoked, and the arguments are delivered thereto" at the last line, for causing the thread to execute the processing of the function.

Referring to FIG. 17, when a program is initialized, a predetermined number of threads are created and are held on standby in a semaphore. In the subsequent processing of the reception side skeleton, one of the threads on standby is selected, and it is unlocked after the message has been delivered thereto. The standing-by threads continues the processing of the message as threads for executing the function, and the unlocked thread enters reception processing for the next request.

FIG. 18 illustrates the flow of the processing items of the reception side skeleton and the standing-by thread in the case where the processing of a function/method to be executed on the reception side, which is of light load, is executed by an interrupt processing thread or a reception thread itself. When it has been decided in the reception side skeleton that the load of the processing of the method intended to be invoked by a request is light, the method is executed by the thread itself for invoking the method in order to process a message. On the other hand, in a case where the load of the processing of the method intended to be invoked by the request is not light, one of threads on standby is selected, and it is unlocked after the message has been delivered thereto. Subsequently, the reception side skeleton enters the next request reception processing. In the case where the, standing-by thread is unlocked after the delivery of the message, the thread for processing the message and the reception thread continue independently.

FIG. 19 illustrates an example of a table for registering whether or not the processing loads of methods are light. Referring to the figure, the table contains "light" or "heavy" which indicates the processing load of each method, in addition to the class name and the method name or method ID of each method, and a pointer to a function.

The contents of the "light/heavy" column in the table of FIG. 19 can be designated by, for example, a: user. Concretely, the user can designate each method which is to be set "light" or "heavy" in the "light/heavy" column, with the command of a program utilizing the ORB and by giving a module name, an interface name and a method name in terms of the arguments of the command.

FIG. 20 illustrates an example of such a method for which the user can set "light" or "heavy", namely, which can be designated with the command. Referring to the figure, the method for which the "light" or "heavy" load is to be set is designated by employing the module name, interface name and method name.

FIGS. 21 and 22 illustrate the flow of the remote procedure call processing in the second aspect of performance of the present invention, in which only the method invoked in the processing of FIG. 20 is specially treated in the processing of the reception side skeleton at the reception of the message as illustrated in FIG. 9. In the processing of the reception side skeleton within the illustrated flow, the function to be invoked is searched for on the basis of the method name contained in the header. Thereafter, when the function has been decided a subject for which the "light" load, for example, is to be set, the light/heavy column of the corresponding method within the table shown in FIG. 19 is set "light" by inverting the module name, interface name and method name. Subsequently, the processing by the reception side program is skipped, and the flow shifts to the next processing of the reception side skeleton. In case of the decision that the function searched for is not such a subject to be set, a thread for executing the designated function is invoked, and the arguments are delivered thereto.

Regarding the setting of the light/heavy column shown in FIG. 19, the method in which the user designates the "light" or "heavy" load with the command as explained above may well be replaced with the following method: When a language compiler, a linker or the IDL (interface definition language compiler) of the CORBA, for creating a method function on a server side, creates the method function, it also creates light/heavy information which indicates whether or not the processing load of the method function is light. The contents of light/heavy information are set on the basis of the created information in ORB initialization processing for creating the table shown in FIG. 19.

In this case, the language compiler or the linker decides whether the method function to be compiled is light or heavy, by the use of criteria as stated below.

As the first criterion, a library function which may possibly invoke a system call is decided to be of heavy processing.

As the second criterion, the method function in which any external function is not invoked is decided to be of light processing.

As the third criterion, the method function in which an external function/external functions is/are invoked is decided light in itself only in a case where all the functions to be invoked are light. In a case where any of the functions to be invoked is heavy, the method function is decided heavy. However, in a case where the method function invokes itself recursively, it is decided heavy.

The compiler or linker decides the heavy/light processing loads in conformity with the criteria as to all functions contained in the program, and creates a file having the same information as in FIG. 19. When the IDL compiler creates the routines of the skeleton, it generates the routine which registers the heavy/light information in the ORB. At the initialization of the ORB, the generated routine is invoked so as to set the contents of the light/heavy column shown in FIG. 19.

Incidentally, the compiler or linker to be used here may be either a static one which has compiled the functions/methods beforehand, or a dynamic one which compiles the functions/methods in executing them.

The present invention can also be performed in an aspect where the size of that area of the physical memory in which data sent from the transmission side is to be stored in the reception side node is designated on the transmission side beforehand, and where the area is reserved in advance of the transmission of the data. Such an aspect will be described as the third aspect of performance of the present invention.

FIG. 23 illustrates the flow of RDMA-buffer token request processing which is executed in the third aspect of performance, and which succeeds to, for example, the connection establishing procedure in the second aspect of performance, i. e., the processing shown in FIGS. 13 and 14. Referring to FIG. 23, an area size desired to be preallocated is transmitted from the transmission side proxy. In the reception side skeleton, a buffer for the RDMA as desired by the transmission side is acquired, and it is wired down, in other words, it is connected to SAN hardware. Further, a buffer token which indicates the buffer using right of the transmission side is replied from the reception side skeleton, and it is stored in the list of buffer tokens in the transmission side proxy.

FIG. 24 illustrates an example of the structure of a buffer request message which is transmitted from the transmission side proxy to the reception side in order to make the buffer preallocation request in the flow of FIG. 23. On the other hand, FIG. 25 illustrates an example of the structure of a reply message which is sent from the reception side as the reply to the buffer request message shown in FIG. 24, namely, a reply message which contains the buffer token. These messages will be explained in conjunction with FIG. 26.

FIG. 26 exemplifies an acquisitional-buffer management table which is managed every connection in the transmission side node by way of example. Referring to the figure, it is indicated that buffers of 4 k bytes numbering 32, buffers of 8 k bytes numbering 4, and buffers of 16 k bytes numbering 4 were acquired at the time of the establishment of the connection, in other words, initially. Regarding the quantity of the initially acquired buffers, the recommended value thereof shall be set at the time of, for example, the forwarding of a product and shall be tunable by a user or a programmer. The "number of tokens judged wanting" and an "additional unit number" in the figure will be explained later. Incidentally, as to a buffer for the RDMA on the side of the transmission node, in which the reply message is to be stored, similarly a request for acquiring a buffer is made on the reception side, while a buffer token is responsively sent from the transmission side. Therefore, the table shown in FIG. 26 is also installed in the reception side node.

In correspondence with the "number of initially acquired tokens" in FIG. 26, the "number of tokens" in the message shown in FIG. 24 is 40 in total, and the "size of buffer as requested" becomes as follows:

|→Numbering 32←|
[4096, 4096, . . . , 4096, 4096, 8192, 8192, 8192, 8192, 16384, 16384, 16384, 16384]

Besides, the "number of tokens" and the "size of acquired buffer" in the reply message shown in FIG. 25 are the same as in the buffer request message shown in FIG. 24. Assuming by way of example that the area of the acquired buffer is reserved from a head address A, the RDMA address of this acquired buffer is expressed as follows:

[A, A+4096×1, A+4096×2, . . . , A+4096×n, . . . , A+4096×32, A+4096×34, A+4096×36, . . . ]

FIGS. 27 and 28 illustrate the flow of remote procedure call processing in the third aspect of performance. As compared with the flow in the first aspect of performance as shown in FIGS. 9 and 10, the flow in FIGS. 27 and 28 differs in processing items which are executed by the transmission side proxy and the reception side skeleton. In the transmission side proxy, arguments are wired down on the physical memory, and only the header of a request is thereafter created. Subsequently, whether or not any buffer token remains is decided. In a case where any buffer token remains, it is embedded into the request header. On the other hand, in a case where no buffer token remains, request processing for an additional buffer token is executed. This processing will be explained later in conjunction with FIG. 29.

Thereafter, the transmission side proxy selects the buffer token, that is, it designates the buffer token indicating that area of the memory of the reception side in which transmission data is to be stored. Subsequently, the arguments are written into the memory area on the skeleton side as indicated by the token, and the request header is transmitted in accordance with the RDMA.

The processing of the reception side skeleton is the same as in that shown in FIG. 9, except the point that the processing for obtaining the arguments by the inversion of the data transmitted in accordance with the RDMA, from the CDR format is not executed. The reasons why the processing of the inversion is not executed, will be explained later.

In a case where a reply from the reception side is necessary, the processing shown in FIG. 28 is executed. This processing differs in the operation of the reception side skeleton as compared with the processing shown in FIG. 10. In the flow of FIG. 28, the reception side skeleton wires a reply area down on the physical memory and thereafter creates only a reply header. Subsequently, whether or not any buffer token remains is decided. In a case where any buffer token remains, it is embedded into the reply header, and a message length is substituted into the header. Thereafter, a reply message is written into the memory area of the proxy side indicated by the token, and the reply header is sent in accordance with the RDMA. On the other hand, in a case where no buffer token remains, the request processing for an additional buffer token as shown in FIG. 29 is executed as in the foregoing.

FIG. 29 illustrates the flow of the buffer-token addition request processing. Herein, the processing will be explained on the assumption that the transmission side proxy of the request makes the request for the additional token. The processing is substantially the same as in FIG. 23, except the following: The transmission side proxy designates that number of the buffer areas of each size which is requested to be added (the unit number), on the basis of those numbers of the buffer areas of the respective sizes which are judged wanting at the time of the processing as indicated in FIG. 26, and it transmits the designated number of the buffer areas to the repception side as the area size desired to be preallocated. In the reception side skeleton, a buffer is acquired in correspondence with the requested size, and a reply containing a buffer token is sent to the transmission side proxy. In the transmission side proxy, the buffer token is added to the list of buffer tokens. Then, the processing is ended.

As stated before, the processing flow in the third aspect of performance as shown in FIGS. 27 and 28 is partly different from the processing flow shown in FIGS. 9 and 10, in the processing items by the transmission side proxy and the reception side skeleton. The differences will be explained more in conjunction with FIGS. 30A and 30B and FIGS. 31A and 31B.

In the processing which is executed by the transmission side proxy in FIG. 27, the arguments are wired down on the physical memory, and thereafter, only the request header is created and is converted into the CDR format, in addition to the point that the data is directly transferred to the memory area of the reception side designated by the buffer token.

Subsequently, in the reception side skeleton, the header is inverted, but the argument creation processing based on the inversion of the data subjected to the RDMA, namely, the message from the CDR format is not executed for the following reasons: The contents written into the area indicated by the token are the same as those of the argument area wired down on the physical memory by the transmission side proxy. The area of the arguments in the last processing which is executed by the reception side skeleton, namely, the processing "a thread for executing the function is invoked, and the arguments are delivered thereto", is the very area indicated by the token.

In contrast, in the processing shown in FIG. 9, the request body is also converted into the CDR format, and the contents of the CDR buffer are transmitted in accordance with the RDMA, while the transmitted data is inverted from the CDR format so as to create the argument area.

FIGS. 30A and 30B illustrate the differences. FIG. 30A serves to explain the processing in FIG. 9. The argument area is created in such a way that, while being inverted from the CDR format, the data subjected to the RDMA transmission is copied into the argument area which is to be delivered to the function of the reception side. The area is referred to by the function of the reception side.

In contrast, in the processing correspondent to FIG. 27 as shown in FIG. 30B, the contents subjected to the RDMA, namely, the contents of the RDMA reception buffer are used as the argument area as they are, and they are referred to by the function of the reception side. On the reception side, therefore, the argument area obtained by the RDMA transmission can be directly delivered to the function or method of the reception side, and the operation of copying the data from the RDMA reception buffer into the argument area can be omitted.

Also on the transmission side, a copying operation can be similarly omitted. FIGS. 31A and 31B are diagrams for elucidating the omission of the copy processing on the transmission side. FIG. 31A serves to explain the processing in FIG. 9. Referring to FIG. 31A, argument areas in the number of, for example, 2 (two) are collected. At a step (1), the two argument areas are converted into the CDR format, and the resulting contents are stored in the CDR buffer. At a step (2), the buffer contents are paged down on the physical memory. At a step (3), the buffer contents are transmitted in accordance with the RDMA. The contents of the reception buffer are inverted from the CDR format and copied into the argument area at a step (4). This argument area is referred to by the function at a step (5).

In contrast, in the processing correspondent to FIG. 27 as shown in FIG. 31B, the transmission side collects two argument areas as exemplified in FIG. 31B or leaves them as they are. At a step (1), the argument areas are paged down on the physical memory. At a step (2), the page-down contents are transmitted in accordance with the RDMA so as to be stored in the reception buffer. The contents of the reception buffer are referred to by the function of the reception side at a step (3). Thus, as compared with the processing shown in FIG. 31A, that shown in FIG. 31B can omit the copying operation in which the contents of the argument areas are stored in the CDR buffer while being converted into the CDR format. Moreover, a plurality of argument areas can be subjected to the RDMA transmission one by one without being collected, and processing for collecting the plurality of argument areas can be omitted in this case.

In the present invention, for example, in the third aspect of performance, the transfer data is stored in that buffer on the physical memory area of the reception side node which is designated by the buffer token selected by the transmission side proxy, and the buffer area is delivered to the thread for executing the function on the reception side, so as to execute the function. Herein, the wire-down of the data receiving area, namely, the buffer on the physical memory can also be released when the reception of the data has been completed and before the buffer is delivered to the thread for executing the function. Such an aspect of performance will be described as the fourth aspect of performance of the present invention.

FIGS. 32 and 33 are flowcharts of remote call processing in the fourth aspect of performance. As compared with the processing of the third aspect of performance as shown in FIG. 27, the processing shown in FIG. 32 differs as follows: In the processing of the reception side skeleton, the physical memory wire-down of the buffer indicated by the token is released after the header has been inverted from the data subjected to the RDMA, and also the object to be invoked has been specified, and before the function to be invoked is searched for on the basis of the method name contained in the header. That is, before the control of the processing shifts to the reception side program, the wire-down of the received-message storage area on the physical memory is released, and the page-out of the received data into the virtual memory area is allowed. Thus, the utilization factor of the physical memory is improved.

Likewise, as compared with the processing shown in FIG. 28, the processing shown in FIG. 33 differs in the point that, in the processing of the transmission side proxy, the physical memory wire-down of the buffer is released after the buffer containing the argument area has been specified on the basis of the token information contained in the reply header. Thus, the utilization factor of the physical memory is improved also in the transmission side node.

Here in the fourth aspect of performance, in the processing of FIG. 32, the physical memory wire-down of the buffer indicated by the token is released by the reception side skeleton. The area of the buffer to be released, namely, the received-message storage area is notified to the reception side skeleton as the area indicated by the buffer token, namely, the received-message storage area when the arrival of the message has been detected by the reception side RDMA driver.

The reception side RDMA driver operates only for the notification of the area, and the release of the physical memory wire down of the buffer is effected through a system call which the reception side skeleton issues to an operation system. Accordingly, a somewhat long time is expended on the whole processing for releasing the physical memory wire-down. In order to avoid this drawback, it is also possible that, at the time of the arrival of the message, the reception side RDMA driver releases the physical memory wire-down beforehand as processing which is executed within the operation system. Such an, aspect of performance will be described as the fifth aspect of performance of the present invention.

FIGS. 34 and 35 are flowcharts of remote procedure call processing in the fifth aspect of performance. As compared with the processing of the fourth aspect of performance as shown in FIG. 32, the processing shown in FIG. 34 differs as follows: In FIG. 32, the physical memory wire-down of the buffer indicated by the token is released by the reception side skeleton, whereas in FIG. 34, the reception side RDMA driver generates a hardware interrupt upon the arrival of the message, and it releases the physical memory wire-down of the buffer indicated by the token, as the processing within the operation system in advance of the delivery of the control to the user side.

Likewise, in the processing shown in FIG. 33, the physical memory wire-down of the buffer storing the reply message therein is released by the transmission side proxy, whereas in the processing shown in FIG. 35, the physical memory wire-down of the buffer is released subsequently to a message arrival interrupt by the transmission side RDMA driver. Thus, the numbers of times of system call invocations decrease on both the reception side and the transmission side, so that the processing time periods of both the sides can be shortened.

Meanwhile, as described in the third aspect of performance before, according to the present invention, the number of the buffer tokens being exchanged is managed using the acquisitional-buffer management table shown in FIG. 26. When the number of the remaining buffer tokens has become small, the additional-buffer-token request processing is executed as explained with reference to FIG. 29. In this regard, it is also possible that, when the number of the buffer tokens has become small, the area of the buffer previously reserved is enlarged (in other words, the processing for the addition request for buffer tokens is executed) in correspondence with the flow rate or traffic of messages between the nodes. Such an aspect of performance of the present invention will be described as the sixth aspect of performance.

FIGS. 36 and 37 are flowcharts of remote procedure call processing in the sixth aspect of performance. As compared with the processing of the third aspect of performance as shown in FIG. 27, the processing shown in FIG. 36 proceeds such that the transmission side proxy transmits the request header to the reception side in accordance with the RDMA and thereafter decides whether or not the number of tokens remaining in the list is smaller than a certain value. By way of example, the number of the tokens remaining in the list is managed in terms of the value of a counter which indicates the number of tokens currently registered in the list of the buffer tokens.

The certain value which serves as the criterion of the number of the tokens remaining in the list, corresponds to the "number of tokens judged wanting" in FIG. 26 by way of example. More specifically, when it has been decided in accordance with the way of flow of the messages till the current time that the number of the buffer tokens remaining in the list is smaller than the number of the tokens judged insufficient for future processing, request processing for the additional buffer tokens is executed. The request processing is the same as shown in FIG. 29.

Although not indicated in FIG. 37, whether or not the number of buffer tokens remaining in the list is smaller than a certain value is decided in the reception side skeleton after the RDMA transmission of the reply header, in the same manner as in the transmission side proxy. The processing for the addition request for buffer tokens for the transmission-side physical memory area for storing the reply message therein can be naturally executed when the number of the remaining buffer tokens is smaller than the certain value.

Figure 38:
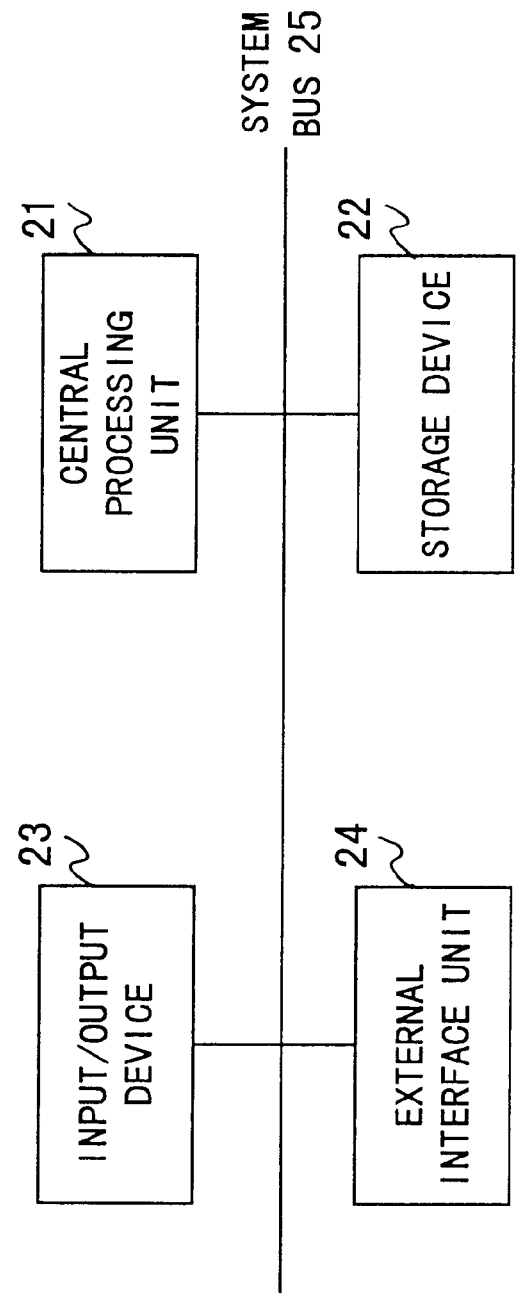
FIG. 38 is a block diagram showing the architecture of a general computer which executes processing relevant to the present invention.

FIG. 38 is a block diagram showing the architecture of a general computer which executes the processing items pertinent to the present invention thus far described. Referring to the figure, the computer includes a central processing unit 21 which controls the whole operation of the computer; a storage device 22, such as semiconductor memory or hard disk device, in which programs to be run by the CPU 21, data processed arithmetically, etc. are stored; an input/output device 23, such as keyboard or printer, through which the programs to be run by the CPU 21 or data are inputted or outputted; and an external interface unit 24 which transmits and receives data to and from another computer equipment through a network, and which has the function of a message controller (MSC). The constituents of the computer are interconnected through a system bus 25. The storage device 22 stores therein the programs which are required in the data transmission side or/and the data reception side in the flowcharts explained as the first through sixth aspects of performance of the present invention, and so forth. The programs are run by the CPU 21.

Figure 39:
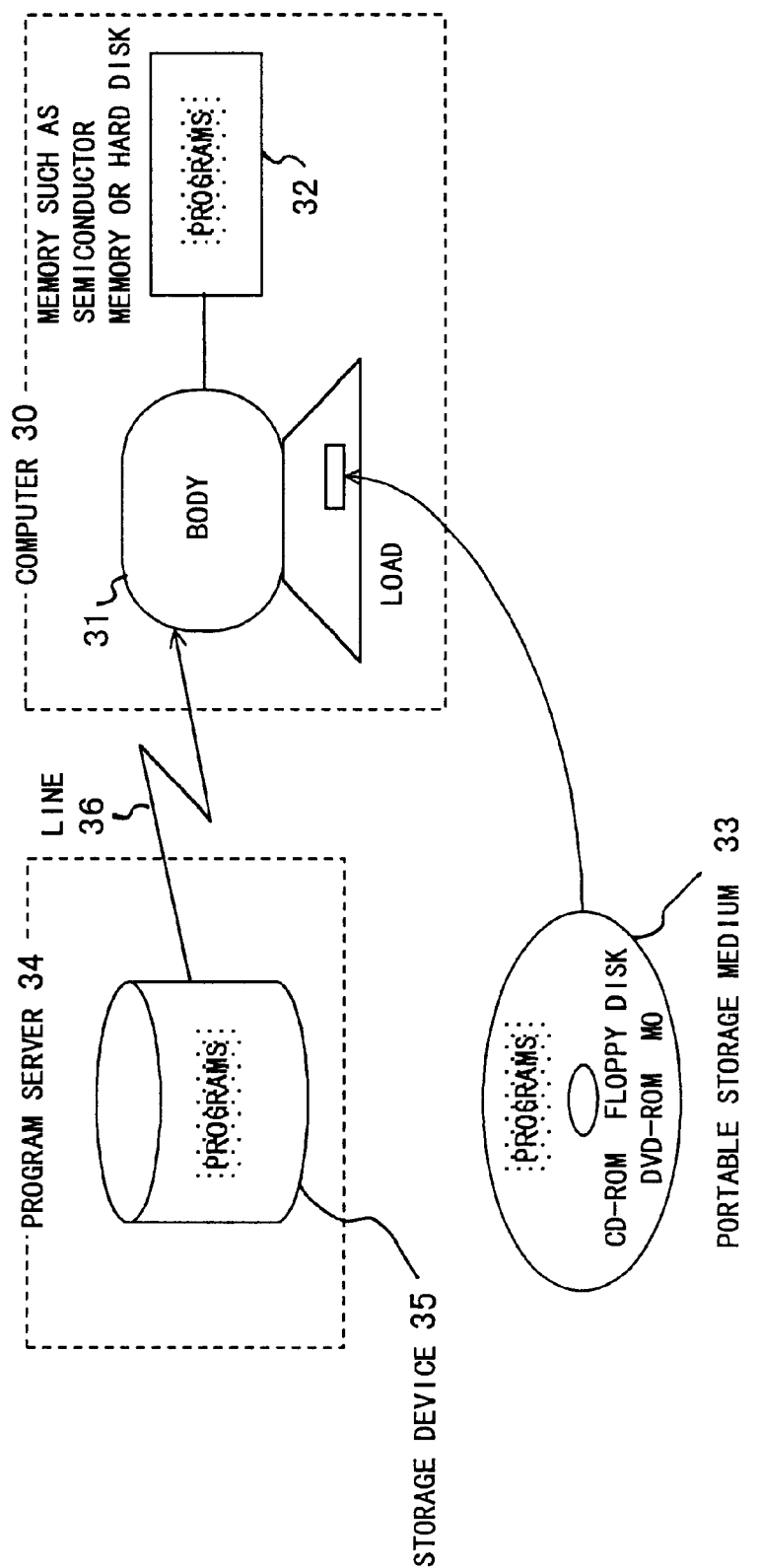
FIG. 39 illustrates examples of storage media which can be read by a computer.

Here, it is also possible that the program required for the processing of the present invention is stored in a portable type storage medium, and that it is loaded into, for example, the storage device 22 so as to execute the processing necessary for the performance of the present invention. FIG. 39 is an explanatory diagram of the computer-readable storage medium for storing such a program therein. Referring to, the figure, a computer 30 is configured of the body 31 and a memory 32 such as semiconductor memory or hard disk. The computer 30 can be loaded with programs etc. from the portable type storage medium 33 and with programs etc. through a network line 36 from a storage device 35 included in a program server 34.

The processing of the present invention can also be executed in such a way that the programs which describe the processing items according to the present invention, for example, the programs which are shown in the flowcharts of FIG. 9, FIG. 10, FIG. 21, FIG. 22, FIG. 27, FIG. 28, FIG. 32 through FIG. 37, are stored in the portable type storage medium 33, and that they are loaded into the computer 30. Usable as the portable type storage medium 33 is any of commercially available and circulatable storage media such as a memory card, floppy disk, CD/ROM, optical disk and magneto-optical disk. Further, the processing of the present invention can be incarnated in such a way that the programs etc. for the processing of the present invention are sent from the side of the program server 34 to the side of the computer 30 through the network line 36 and are loaded.

As described above in detail, according to the present invention, the delay of the data transfer between computers each having an object request broker mechanism or a remote procedure call mechanism can be shortened by utilizing the remote direct memory access (RDMA) based on a system area network as has heretofore been employed for scientific and technological computations, etc. Accordingly, the present invention is greatly contributive to enhancement in the efficiency of data processing in a distributed computing environment.

Besides, according to the present invention, when the data representation formats of the particular computer itself and the communicating opposite computer are identical, the conversion of transfer data into a common data format, for example, the CDR format in the CORBA can be omitted. When the data representation formats are different, the computer on a transmission side can convert transfer data into the data representation format of the computer on the opposite side and then transfer the resulting data, or the particular computer itself can invert the representation format of data transferred from the opposite computer into the data representation format of its own and then store the resulting data in the physical memory area of its own.

Moreover, according to the present invention, the particular computer can transfer the data of a function being data on the physical memory area of its own, directly toward the opposite computer in a state where an area designated by arguments for the function is wired down on the physical memory, and the data to be transferred can be prevented from being saved in a virtual storage area during the data transfer.

Furthermore, according to the present invention, a thread which generates a hardware interrupt for the particular computer upon the arrival of a message containing transfer data as sent from the opposite computer can execute by itself the processing of a function/method which is executed with the transfer data and which is light.

What is claimed is:

1. A particular computer having a remote procedure call mechanism or an object request broker mechanism in a distributed computing environment, comprising:

a physical memory;

data readout means for reading out data stored in said physical memory; and remote direct memory access means for transferring the data read out by said data readout means, directly to a physical memory included in a communicating opposite computer which is connected to said particular computer via a network without converting when an identical data representation format, defining endian and alignment of the data, is employed by said particular computer and the communicating opposite computer.

2. A particular computer as defined in claim 1, wherein said remote direct memory access means transfers a message which contains the data, and to which the data representation format of said particular computer has been affixed.

3. A particular computer as defined in claim 1, further comprising data-representation-format management means for managing the data representation formats of the respective computers which are connected to said network, and wherein said remote direct memory access means transfers the data through said network in the data representation format of said particular computer without conversion, in accordance with managed contents of said data-representation-format management means.

4. A particular computer having a remote procedure call mechanism or an object request broker mechanism in a distributed computing environment, comprising:
- a physical memory;
- data readout means for reading out data stored in said physical memory; and
- remote direct memory access means for transferring the data read out by said data readout means, directly to a physical- memory included in a communicating opposite computer which is connected to said particular computer via a network and for converting, when different data representation formats, defining endian and alignment of a set of data, are employed by said particular computer and by the communicating opposite computer, a first data representation format of the set of data into a second data representation format employed by the communicating opposite computer prior to transferring the set of data through the network.

5. A particular computer as defined in claim 4,
- further comprising data-representation-format management means for managing the data representation formats of the respective computers which are connected to said network, and
- wherein said remote direct memory access means converts the data representation format of the data and then transfers the set of data through the network, in accordance with managed contents of said data-representation-format management means.

6. A particular computer as defined in claim 4, wherein said remote direct memory access means converts said data representation format of said data into said data representation format employed in said communicating opposite computer, stores the set of data in an area wired down on said physical memory of said particular computer and transfers the set of data directly to the physical memory of the communicating opposite computer.

7. A particular computer as defined in claim 4, wherein the data concerns a function; and
- wherein said remote direct memory access means transfers the data in an area designated by arguments of the function, directly to the physical memory of the communicating opposite computer in a state in which the area is wired down on said physical memory of said particular computer.

8. A particular computer as defined in claim 4, wherein the data concerns a function; and
- wherein said remote direct memory access means transfers the data in a plurality of areas designated by values of a plurality of arguments of the function, directly to the physical memory of the communicating opposite computer in a state in which the plurality of areas are wired down on said physical memory of said particular computer.

9. A particular computer as defined in claim 4, further comprising data delivery means for delivering a data storage area, in which data transferred from remote direct memory access means of the communicating opposite computer is stored and which has been wired down on said physical memory of said particular computer beforehand, to a function/method that is executed in said particular computer.

10. A particular computer as defined in claim 9, further comprising memory-wire-down release means for releasing the wire-down of the data storage area on said physical memory in advance of the delivery of said data storage area by said data delivery means.

11. A particular computer as defined in claim 10, wherein said memory-wire-down release means releases said wire-down of the data storage area in accordance with a designation of the area for which said wire-down on said physical memory is to be released, the designation being affixed to a message containing the data as transferred from said remote direct memory access means of said communicating opposite computer.

12. A particular computer as defined in claim 4, further comprising wire-down-area-capacity change request means for requesting the communicating opposite computer to change a capacity of an area which has been wired down on the physical memory of the communicating opposite computer beforehand, and in which the data to be transferred from said remote direct memory access means of said particular computer is stored.

13. A particular computer as defined in claim 12, wherein said wire-down-area-capacity change request means makes the request for changing the capacity of the area, in accordance with a quantity of the data which is to be transferred from said particular computer to the communicating opposite computer.

14. A particular computer as defined in claim 13, further comprising physical-memory-wire-down-area adjustment means for adjusting a capacity of an area which has been wired down on said physical memory of said particular computer beforehand, and in which the data to be transferred from said remote direct memory access means of said communicating opposite computer is stored, in compliance with the request for changing the capacity of the area as made by said wire-down-area-capacity change request means of said communicating opposite computer.

15. A particular computer as defined in claim 12, further comprising physical-memory-wire-down-area adjustment means for adjusting a capacity of an area which has been wired down on said physical memory of said particular computer beforehand; and in which the data to be transferred from said remote direct memory access means of said communicating opposite computer is stored, in compliance with the request for changing the capacity of the area as made by said wire-down-area-capacity change request means of said communicating opposite computer.

16. A particular computer as defined in claim 4, further comprising interrupt processing means for generating a hardware interrupt when a message containing the data as transferred from remote direct memory access means of the communicating opposite computer has arrived, and for executing processing of a function/method to be executed with the data when a processing load is light.

17. A particular computer as defined in claim 16,
- further comprising light-load-processing storage means for storing therein data which indicates whether the processing load of the function/method to be executed with the data of the message is light, and
- wherein said interrupt processing means discerns the light load of said processing of said function/method in accordance with the, data stored in said light-load-processing storage means, and executes said processing of said function/method in case of said light load.

18. A particular computer as defined in claim 17, wherein said light-load-processing storage means stores therein the data which is based on a designation of the processing load of said function/method as light given by a user who uses said particular computer.

19. A particular computer having a remote procedure call mechanism or an object request broker mechanism in a distributed computing environment, comprising:
- a physical memory;
- data readout means for reading out data stored in said physical memory;

remote direct memory access means for transferring the data read out by said data readout means, directly to a physical memory included in a communicating opposite computer which is connected to said particular computer via a network; and data format conversion means, operating when different data representation formats, defining endian and alignment of a set of data, are employed by said particular computer and the communicating opposite computer, for converting data transferred from remote direct memory access means of the communicating opposite computer, into a data representation format employed in said particular computer and then storing resulting data in said physical memory of said particular computer.

20. A particular computer as defined in claim 19, further comprising data-representation-format management means for managing the data representation formats 6f the respective computers which are connected to said network, and wherein said data format conversion means converts the data representation format of the transferred data in accordance with managed contents of said data-representation-format management means.

21. A particular computer as defined in claim 19, wherein said remote direct memory access means transfers a message which contains a set of the data, and to which the data representation format of said particular computer has been affixed; and wherein said data format conversion means converts an original data representation format of the set of data contained in the message, based on the data representation format affixed to the message.

22. A particular computer having a remote procedure call mechanism or an object request broker mechanism in a distributed computing environment, comprising:

a physical memory;

data readout means for reading out data stored in said physical memory;

remote direct memory access means for transferring the data read out by said data readout means, directly to a physical memory included in a communicating opposite computer which is connected to said particular computer via a network; and data-representation-format notification means for notifying a data representation format, defining endian and alignment of a set of data, in said particular computer to the communicating opposite computer, in starting a communication connection between said particular computer and the communicating opposite computer.

23. A particular computer having a remote procedure call mechanism or an as object request broker mechanism in a distributed computing environment, comprising:

a physical memory;

data readout means for reading out data stored in said physical memory;

remote direct memory access means for transferring the data read out by said data readout means, directly to a physical memory included in a communicating opposite computer which is connected to said particular computer via a network;

light-load-processing storage means for storing therein load data which indicates whether a processing load of a function/method to be executed with the data of the message is light based on processing of the function/method as rendered by a compiler/linker that compiles the function/method; and interrupt processing means for generating a hardware interrupt when a message containing the data as transferred from remote direct memory access means of the communicating opposite computer has arrived and for executing processing of the function/method to be executed with the data when the processing load is light in accordance with the data stored in said light-load-processing storage means.

24. A particular computer having a remote procedure call mechanism or an object request broker mechanism in a distributed computing environment, comprising:

a physical memory;

data readout means for reading out data stored in said physical memory;

remote direct memory access means for transferring the data read out by said data readout means, directly to a physical memory included in a communicating opposite computer which is connected to said particular computer via a network;

light-load-processing storage means for storing therein load data which indicates whether a processing load of a function/method to be executed with the data of the message is light, based on processing of the function/method as rendered by an under-execution compiler/linker that compiles the function/method during execution thereof; and interrupt processing means for generating a hardware interrupt when a message containing the data as transferred from remote direct memory access means of the communicating opposite computer has arrived and for executing processing of the function/method to be executed with the data when the processing load is light in accordance with the load data stored in said light-load-processing storage means.

25. A particular computer having a remote procedure call mechanism or an object request broker mechanism in a distributed computing environment, comprising:

a physical memory;

data readout means for reading out data stored in said physical memory; and remote direct memory access means for transferring the data read out by said data readout means directly to a physical memory included in a communicating opposite computer, connected to said particular computer via a system area network providing a physical communication line, without converting the data when an identical data representation format, defining endian and alignment of the data, is employed by said particular computer and the communicating opposite computer.

26. A particular computer as defined in claim 25, wherein said remote direct memory access means transfers a message which contains the data, and to which the data representation format of said particular computer has been affixed.

27. A particular computer as defined in claim 25, further comprising data-representation-format management means for managing the data representation formats of the respective computers which are connected to said network, and wherein said remote direct memory access means transfers the data through the network in the data representation format of said particular computer without conversion, in accordance with managed contents of said data-representation-format management means.

28. A particular computer having a remote procedure call mechanism or an object request broker mechanism in a distributed computing environment, comprising:
- a physical memory;
- data readout means for reading out data stored in said physical memory; and
- remote direct memory access means for transferring the data read out by said data readout means, directly to a physical memory included in a communicating opposite computer which is connected to said particular computer via a system area network providing a physical communication line, and for converting, when different data representation formats, defining endian and alignment of a set of data, are employed by said particular computer and by the communicating opposite computer, a first data representation format of the set of data into a second data representation format employed by the communicating opposite computer prior to transferring the set of data through the network.

29. A particular computer as defined in claim 28,
- further comprising data-representation-format management means for managing the data representation formats of respective computers which are connected to the network, and
- wherein said remote direct memory access means converts the data representation format of the data and then transfers the set of data through the network, in accordance with managed contents of said data-representation-format management means.

30. A particular computer as defined in claim 28, wherein said remote direct memory access means converts the data representation format of the data into the data representation format employed in the communicating opposite computer, stores the set of data in an area wired down on said physical memory of said particular computer and transfers the set of data directly to the physical memory of the communicating opposite computer.

31. A particular computer as defined in claim 28, wherein said data is data which concerns a function; and
- wherein said remote direct memory access means transfers the data in an area designated by arguments of the function, directly to the physical memory of the communicating opposite computer in a state in which the designated area is wired down on said physical memory of said particular computer.

32. A particular computer as defined in claim 28, wherein the data concerns a function; and
- wherein said remote direct memory access means transfers the data in a plurality of areas designated by values of a plurality of arguments of the function, directly to the physical memory of the communicating opposite computer in a state in which the plurality of designated areas are wired down on said physical memory of said particular computer.

33. A particular computer as defined in claim 28, further comprising data delivery means for delivering a data storage area, in which data transferred from the remote direct memory access means of the communicating opposite computer is stored and which has been wired down on said physical memory of said particular computer beforehand, to a function/method that is executed in said particular computer.

34. A particular computer as defined in claim 33, further comprising memory-wire-down release means for releasing the wire-down of the data storage area on said physical memory in advance of the delivery of the data storage area by said data delivery means.

35. A particular computer as defined in claim 34, wherein said memory-wire-down release means releases said wire-down of the data storage area in accordance with a designation of the area for which the wire-down on said physical memory is to be released, the designation being affixed to a message containing the data as transferred from the remote direct memory access means of the communicating opposite computer.

36. A particular computer as defined in claim 28, further comprising wire-down-area-capacity change request means for requesting the communicating opposite computer to change a capacity of an area which has been wired down on the physical memory of the communicating opposite computer beforehand, and in which the data to be transferred from said remote direct memory access means of said particular computer is stored.

37. A particular computer as defined in claim 36, wherein said wire-down-area-capacity change request means makes the request for changing the capacity of the area, in accordance with a quantity of the data which is to be transferred from said particular computer to the communicating opposite computer.

38. A particular computer as defined in claim 37, further comprising physical-memory-wire-down-area adjustment means for adjusting a capacity of an area which has been wired down on said physical memory of said particular computer beforehand, and in which the data to be transferred from the remote direct memory access means of the communicating opposite computer is stored, in compliance with the request for changing the capacity of the area as made by the wire-down-area-capacity change request means of said communicating opposite computer.

39. A particular computer as defined in claim 36, further comprising physical-memory-wire-down-area adjustment means for adjusting a capacity of an area which has been wired down on said physical memory of said particular computer beforehand, and in which the data to be transferred from the remote direct memory access means of the communicating opposite computer is stored, in compliance with the request for changing the capacity of the area as made by the wire-down-area-capacity change request means of the communicating opposite computer.

40. A particular computer as defined in claim 28, further comprising interrupt processing means for generating a hardware interrupt when a message containing the data as transferred from the remote direct memory access means of the communicating opposite computer has arrived, and for executing processing of a function/method to be executed with the data when a processing load is light.

41. A particular computer as defined in claim 40,
- further comprising light-load-processing storage means for storing therein data which indicates whether processing of the function/method to be executed with the data of the message is light, and
- wherein said interrupt processing means discerns the light processing load of the function/method in accordance with the data stored in said light-load-processing storage means, and executes the processing of the function/method in case of the light processing load.

42. A particular computer as defined in claim 41, wherein said light-load-processing storage means stores therein the data which is based on a designation of light processing load of the function/method as given by a user who uses said computer.

43. A particular computer having a remote procedure call mechanism or an object request broker mechanism in a distributed computing environment, comprising:

a physical memory;

data readout means for reading out data stored in said physical memory;

remote direct memory access means for transferring the data read out by said data readout means, directly to a physical memory included in a communicating opposite computer which is connected to said particular computer via a system area network providing a physical communication line; and data format conversion means, operating when different data representation formats, defining endian and alignment of a set of data, are employed on a side of said particular computer and on a side of the communicating opposite computer, for converting data transferred from remote direct memory access means of the communicating opposite computer, into a data representation format employed in said particular computer and then storing resulting data in said physical memory of said particular computer.

44. A particular computer as defined in claim 43, further comprising data-representation-format management means for managing the data representation formats of respective computers which are connected to the network, and wherein said data format conversion means converts the data representation format of the transferred data in accordance with managed contents of said data-representation-format management means.

45. A particular computer as defined in claim 43, wherein said remote direct memory access means transfers a message which contains the data, and to which the data representation format of said particular computer has been affixed; and wherein said data format conversion means converts the data representation format-of the data contained in the message, based on the data representation format affixed to the message.

46. A particular computer having a remote procedure call mechanism or an object request broker mechanism in a distributed computing environment, comprising:

a physical memory;

data readout means for reading out data stored in said physical memory;

remote direct memory access means for transferring the data read out by said data readout means, directly to a physical memory included in a communicating opposite computer which is connected to said particular computer via a system area network providing a physical communication line; and data-representation-format notification means for notifying a data representation format, defining endian and alignment of a set of data, in said particular computer to the communicating opposite computer, in starting a communication connection between said particular computer and the communicating opposite computer.

47. A particular computer having a remote procedure call mechanism or an object request broker mechanism in a distributed computing environment, comprising:

a physical memory;

data readout means for reading out data stored in said physical memory;

remote direct memory access means for transferring the data read out by said data readout means, directly to a physical memory included in a communicating opposite site computer which is connected to said particular computer via a system area network;

light-load-processing storage means for storing therein load data which indicates whether a processing load of a function/method to be executed with the data of the message is light based on processing of the function/method as rendered by a compiler/linker that compiles the function/method; and interrupt processing means for generating a hardware interrupt when a message containing the data as transferred from remote direct memory access means of the communicating opposite computer has arrived and for executing processing of the function/method to be executed with the data when the processing load is light in accordance with the data stored in said light-load-processing storage means.

48. A particular computer having a remote procedure call mechanism or an object request broker mechanism in a distributed computing environment, comprising:

a physical memory;

data readout means for reading out data stored in said physical memory;

remote direct memory access means for transferring the data read out by said data readout means, directly to a physical memory included in a communicating opposite site computer which is connected to said particular computer via a system area network;

light-load-precessing storage means for storing therein load data which indicates whether a processing load of a function/method to be executed with the data of the message is light based on processing of the function/method as rendered by an under-execution compiler/linker that compiles the function/method during execution thereof; and interrupt processing means for generating a hardware interrupt when a message containing the data as transferred from remote direct memory access means of the communicating opposite computer has arrived and for executing processing of the function/method to be executed with the data when the processing load is light in accordance with the data stored in said light-load-processing storage means.

49. A method of transferring data for a particular computer having a remote procedure call mechanism or an object request broker mechanism in a distributed computing environment, comprising:

reading out the data stored in a physical memory included in the computer;

transferring the data directly to a physical memory included in a communicating opposite computer which is connected to the particular computer via a network; and converting a first data representation format of the data into a second data representation format employed by the communicating opposite computer prior to said transferring, when different data representation formats, defining endian and alignment of the data, are employed by the particular computer and the communicating opposite computer.

50. A storage medium storing therein a program which can be read out by a particular computer having a remote procedure call mechanism or an object request broker mechanism in a distributed computing environment, and which can be run by the particular computer to control a process comprising:

reading out data stored in a physical memory included in the particular computer; and transferring the data directly to a physical memory included in a communicating opposite computer which is connected to the particular computer via a network; and converting a first data representation format of the data into a second data representation format employed by the communicating opposite computer prior to said transferring, when different data representation formats, defining endian and alignment of the data, are employed by the particular computer and the communicating opposite computer.

51. A computer connected to a similarly constructed computer via a network and having at least one of a remote procedure call mechanism and an object request broker mechanism in a distributed computing environment, comprising:

a physical memory;

a data access unit, coupled to said physical memory, to read data stored in said physical memory;

a data format conversion unit, coupled to said network, operating when different data representation formats, defining endian and alignment of a set of data, are employed by said computer and ;the similarly constructed computer, to convert the data read by said data access unit into converted data having a data representation format employed in the similarly constructed computer; and a remote direct memory access device, coupled to said data access unit and the network, to transfer the data read by said data access unit without conversion directly to a physical memory included in the similarly constructed computer, when identical data representation formats are used in said computer and the similarly constructed computer.

52. A computer connected to a similarly constructed computer via a network and having at least one of a remote procedure call mechanism and an object request broker mechanism in a distributed computing environment, comprising:

a physical memory;

a data access unit, coupled to said physical memory, to read data stored in said physical memory;

a data format conversion unit, coupled to said network, operating when different data representation formats, defining endian and alignment of a set of data, are employed by said computer and, the similarly constructed computer, to convert the data read by said data access unit into converted data having a data representation format employed in the similarly constructed computer; and a remote direct memory access device, coupled to said data access unit and the network, to transfer the converted data directly to a physical memory included in the similarly constructed computer via the network.

53. A computer connected to a similarly constructed computer via a network and having at least one of a remote procedure call mechanism and an object request broker mechanism in a distributed computing environment, comprising:

a physical memory;

a data access unit, coupled to said physical memory, to read data stored in said physical memory;

a remote direct memory access device, coupled to said data access unit and the network, to transfer the data read by said data access unit directly to a physical memory included in the similarly constructed computer via the network; and a data format conversion unit, coupled to said network, operating when different data representation formats, defining endian and alignment of a set of data, are employed by said computer and the similarly constructed computer, to convert the set of data transferred from a remote direct memory access device of the similarly constructed computer, into a data representation format employed in said computer and then store converted data in said physical memory of said computer.

54. A computer connected to a similarly constructed computer via a network and having at least one of a remote procedure call mechanism and an object request broker mechanism in a distributed computing environment, comprising:

a physical memory;

a data access unit, coupled to said physical memory, to read data stored in said physical memory;

a remote direct memory access device, coupled to said data access unit and the network, to transfer the data read by said data access unit directly to a physical memory included in the similarly constructed computer via the network;

a communication unit, coupled to the network, to communicate a data representation format, defining endian and alignment of the data, to the similarly constructed computer in starting a communication connection between said computer and the similarly constructed computer.

55. A computer connected to a similarly constructed computer via a network and having at least one of a remote procedure call mechanism and an object request broker mechanism in a distributed computing environment, comprising:

a physical memory;

a data access unit, coupled to said physical memory, to read data stored in said physical memory;

a remote direct memory access device, coupled to said data access unit and the network, to transfer the data read by said data access unit directly to a physical memory included in the similarly constructed computer via the network;

a light-load-processing storage unit to store load data indicating whether a processing load of a function/method to be executed with the data of the message is light, based on processing of the function/method as rendered by a compiler/linker that compiles the function/method; and an interrupt generator to generate a hardware interrupt when a message containing the data as transferred from a remote direct memory access device of the similarly constructed computer has arrived; and a processor, coupled to said physical memory and said interrupt generator, to execute the function/method with the data when the processing load is light in accordance with the load data stored in said light-load-processing storage unit.

56. A computer connected to a similarly constructed computer via a network and having at least one of a remote procedure call mechanism and an object request broker mechanism in a distributed computing environment, comprising:

a physical memory;

a data access unit, coupled to said physical memory, to read data stored in said physical memory;

a remote direct memory access device, coupled to said data access unit and the network, to transfer the data read by said data access unit directly to a physical memory included in the similarly constructed computer via the network;

a light-load-processing storage unit to store load data indicating whether a processing load of a function/method to be executed with the data of the message is light, based on processing of the function/method as rendered by an under-execution compiler/linker that compiles the function/method during execution thereof; and an interrupt generator to generate a hardware interrupt when a message containing the data as transferred from a remote direct memory access device of the similarly constructed computer has arrived; and a processor, coupled to said physical memory and said interrupt generator, to execute the function/method with the data when the processing load is light in accordance with the load data stored in said light-load-processing storage unit.

* * * * *